(12) United States Patent
Graham et al.

(10) Patent No.: US 12,269,953 B2
(45) Date of Patent: Apr. 8, 2025

(54) MONOEXTRUDED HEMP COMPOSITE BOARD

(71) Applicants: John D. Graham, Portland, OR (US); John J. Bradley, Harlingen, TX (US)

(72) Inventors: John D. Graham, Portland, OR (US); John J. Bradley, Harlingen, TX (US)

(*) Notice: Subject to any disclaimer, the term of this patent is extended or adjusted under 35 U.S.C. 154(b) by 0 days.

(21) Appl. No.: 18/278,450

(22) PCT Filed: May 26, 2023

(86) PCT No.: PCT/US2023/023776
§ 371 (c)(1),
(2) Date: Aug. 23, 2023

(87) PCT Pub. No.: WO2024/049521
PCT Pub. Date: Mar. 7, 2024

(65) Prior Publication Data
US 2024/0084143 A1 Mar. 14, 2024

Related U.S. Application Data

(60) Provisional application No. 63/576,428, filed on Feb. 3, 2023, provisional application No. 63/403,450, filed on Sep. 2, 2022.

(51) Int. Cl.
*C08L 97/02* (2006.01)
*C08J 9/00* (2006.01)
*C08J 9/04* (2006.01)

(52) U.S. Cl.
CPC ............ *C08L 97/02* (2013.01); *C08J 9/0061* (2013.01); *C08J 9/04* (2013.01); *C08J 2201/03* (2013.01);
(Continued)

(58) Field of Classification Search
CPC .. C08L 97/02; C08L 2203/14; C08L 2205/16; C08J 9/0061; C08J 9/04;
(Continued)

(56) References Cited

U.S. PATENT DOCUMENTS

| | | | |
|---|---|---|---|
| 5,891,374 A | 4/1999 | Shah et al. | |
| 2003/0019171 A1* | 1/2003 | Thibault | E04F 15/10 52/592.1 |

(Continued)

*Primary Examiner* — Christina H. W. Rosebach
(74) *Attorney, Agent, or Firm* — AdamsIP, LLC; Edward Brinkley Garner, III; James Hunter Adams

(57) ABSTRACT

A mono-extruded hemp composite board (EHB) is provided. By combining hemp feedstocks with virgin and/or recycled binder materials and subsequently extruding them into an extrudate sheet, an environmentally friendly alternative to tradition construction materials is created. Secondary feedstocks and waste products from other production streams may be added during the extrusion process to enhance the physical characteristics of the extrudate sheet in addition to reducing the raw material costs and creating a more environmentally friendly construction material. The extrudate sheet produced using such materials is structurally superior to traditional construction materials due to the structural characteristics of dispersed hemp feedstocks; the complete encapsulation of hemp feedstocks in the binder material; and the lower hygroscopic and higher pest and mold resistance properties of hemp feedstocks. A downstream extrusion arrangement may be used to pattern the extrudate sheet and/or create molded shapes that are difficult to achieve in traditional construction materials, increasing the customization potential of final EHB products relative to traditional construction materials.

15 Claims, 17 Drawing Sheets

(52) U.S. Cl.
CPC ........ *C08J 2397/02* (2013.01); *C08J 2423/06* (2013.01); *C08J 2423/12* (2013.01); *C08J 2477/00* (2013.01); *C08L 2203/14* (2013.01); *C08L 2205/16* (2013.01)

(58) Field of Classification Search
CPC   C08J 2201/03; C08J 2397/02; C08J 2423/06; C08J 2423/12; C08J 2477/00
See application file for complete search history.

(56) References Cited

U.S. PATENT DOCUMENTS

| | | | |
|---|---|---|---|
| 2009/0181207 A1* | 7/2009 | Michalik | B29C 48/07 264/176.1 |
| 2012/0046394 A1* | 2/2012 | Lu | B29C 70/506 264/103 |
| 2014/0329060 A1 | 11/2014 | Vivier et al. | |
| 2019/0003189 A1* | 1/2019 | Döhring | B32B 5/022 |
| 2019/0270263 A1 | 9/2019 | Mukherji | |
| 2023/0250244 A1* | 8/2023 | Killingsworth | B29B 9/14 524/13 |

* cited by examiner

Fiber and Binder / View From Transverse Direction

Hurd and Binder / View From Transverse Direction

Fiber, Hurd and Binder / View From Transverse Direction

Fiber / View From Top of Board Fibers Will Orient
In The Machine Direction, But
Overlap Creating Strength

MONOEXTRUDED HEMP COMPOSITE BOARD

CROSS-REFERENCE TO RELATED APPLICATIONS

This application claims the benefit of U.S. Provisional Application Ser. No. 63/403,450, filed on Sep. 2, 2022, and U.S. Provisional Application Ser. No. 63/576,428, filed on Feb. 3, 2023, and International Application Serial No. PCT/US23/23776, filed on May 26, 2023, which are incorporated herein in their entirety by reference.

FIELD OF THE DISCLOSURE

The subject matter of the present disclosure refers generally to a mono-extruded composite board comprising hemp feedstocks, recycled feedstocks, and binder material.

BACKGROUND

The three dominant construction boards used in building construction and remodeling have been primary building ingredients for decades. Plywood began to be used in the United States as a general building material in the 1920's and 30's for prefabricated houses focused on quick fabrication and easy disassembly and low cost. Drywall was invented in 1916. It was originally marketed as a wallboard to protect homes from urban fires, and as the poor man's alternative to plaster walls. Oriented Strand Board (OSB) was originally called waferboard and was created in the 1960's as a cheaper alternative to plywood.

Today, these three common construction boards in their various forms cover most interior and exterior walls, ceilings, roofs, and floors throughout the United States. Though each of the three boards can provide many benefits as building materials, each board has inherent drawbacks. The production of plywood and OSB are waste-intensive processes, emitting large amounts of wood wastes, water wastes, resin and wax wastes, and volatile emissions. Drywall production also has a noticeable environmental impact. Processing the gypsum releases particulates from the gypsum powder in addition to sulfur dioxide, nitrous oxide, and carbon monoxide. Heating the gypsum throughout the production process also has a high energy cost.

Each of these construction boards can degrade over their service life due to the inherent problems that exist in their material composition, process of manufacture, and product application. In particular, the hygroscopic properties of the wood pieces that comprise both plywood and OSB and the porous nature of gypsum used as the base material for drywall can make them a poor construction material choice in situations where they might be exposed to consistent patterns of moisture and humidity.

Hemp biomass is a renewable, recyclable, and compostable. Hemp plants are relatively easy to grow in most climates with a fast yield, typically reaching maturity in 85-100 days. Its capability to be grown almost anywhere creates maximum flexibility for site location and the ability to minimize the transportation footprint. Hemp returns 50% of the nutrients it takes from the soil and has the highest yield per acre of any natural fiber. Importantly, hemp bast fiber is ten times stronger than wood fiber, is lighter and less expensive to produce.

Accordingly, there is a need in the art for a lower cost, superior quality construction board made from sustainable feedstocks and that possess improved mechanical and physical properties when compared to conventional construction boards.

SUMMARY

A mono-extruded hemp composite board (EHB) comprising hemp is provided. In one aspect, the system is a finished EHB product made from a combination of hemp bast fiber, hemp hurd, and binder material that is mixed and extruded to create construction materials of different grades, depending on the application in which the finished EHB is to be used. In another aspect, the finished EHB product may be configured to match or exceed the strength of conventional construction materials, including oriented strand board (OSB), plywood, gypsum-based boards, and other wood-based and other composite boards. In yet another aspect, the finished EHB product may be configured to be weather resistant, pest resistant, mildew resistant, fire resistant, insulative, sound-deadening, etc. All of these factors will increase the service life of the EHB when compared to that of traditional construction materials. In yet another aspect, the finished EHB product may be made with sustainably sourced feedstocks and industrial/residential waste streams to have a positive impact on the overall environment. In yet another aspect, the method produces replacement construction material products that can, through the use of extrusion dies and post extrusion processing, create molded, shaped and patterned construction materials designed to reduce installation times as well as prevent water penetration. Generally, the system of the present disclosure is designed to be an environmentally friendly alternative to traditional constructions materials that possess improved physical properties, have longer functional lifetimes, and reduce the overall carbon footprint of construction projects.

A finished EHB product preferably comprises a top surface, bottom surface, and a plurality of sides and is made from an extrudate sheet comprising hemp feedstocks and binder material and formed by an upstream extrusion arrangement. The extrudate created within the extruder of the upstream extrusion arrangement is pushed through a die where the extrudate is shaped into an extrudate sheet and modified via post extrusion processing until the finished EHB product is obtained. Shear force created during the extrusion process and acting on the extrudate will force the binder fibers/chains to align in the output direction of the extruder as the extrudate exits the die outlet of the manifold, resulting in an extrudate sheet that is anisotropic in behavior due to alignment of the binder material and hemp feedstocks in a single direction. Though the hemp feedstocks encapsulated within the binder material will also generally align in the output direction of the extruder, the highly varied structure of the hemp feedstocks will cause the composite material to have both the positive physical/mechanical properties of a material having highly ordered binder fibers as well as the cross-bonding of layers due to the hemp-binder matrix, enhancing properties such as edge strength and pull strength. The amount of hemp biomass relative to the binder is the primary variable that determines the various physical/mechanical properties of the extrudate sheet and allows for the creation of a finished EHB product for a desired application.

The process of making a finished EHB product involves processing and separating hemp biomass into hemp feedstocks, primarily that of hemp bast fiber and hemp hurd, via the separation arrangement. These hemp feedstocks are then mixed with a binder material via the upstream extrusion arrangement to create an extrudate that is subsequently molded and processed into a final EHB product via the downstream extrusion arrangement. In a preferred embodiment, hemp hurd used to create the finished EHB product comprises a particle size of 0.002-8 millimeters, and the hemp bast fiber used to create the finished EHB product comprises a diameter range of 0.002-0.200 millimeters and a length range of 0.002-36 millimeters. However, one with skill in the art will understand that hemp hurd and hemp bast fiber having other diameters and/or lengths may be used without departing from the inventive subject matter described herein.

The upstream extrusion arrangement generally comprises a hopper, dryer, extruder, and manifold. The feedstocks may be fed by the hopper into the extruder individually or as a blend of dry components. The dryer may be used to dry the feedstocks before being fed to the extruder, which will result in the creation of an extrudate with a more consistent moisture content. Alternatively, the feedstocks may be dried in another device/section of the system, allowing the hopper heater to simply maintain the moisture content within the dried feedstocks prior to injection into the extruder as well as to maintain a desirable feedstock temperature. The extruder is used to mix the feedstocks under high shear force to create the extrudate used to create the finished EHB product. In a preferred embodiment, the extruder generally comprises a motor, gear box operably connected to the motor, screw operably connected to the gear box, barrel, and manifold. The screw is configured to mix the feedstocks within the barrel. Feedstocks are injected into the barrel via a throat of the barrel, wherein the feedstocks are processed into an extrudate as it moves through said barrel due to action of the screw.

The extrudate is pushed through an opening of said barrel and into a manifold, which is configured to accept the extrudate from the barrel via an entry channel and distribute said extrudate across a width of a die outlet. The die outlet of the manifold molds the extrudate produced by the extruder into an extrudate sheet having a desired shape, wherein said desired shape may or may not require further processing via a choker bar, lower lip, flex-lip, and/or machinery of a downstream extrusion arrangement to produce a finished EHB product. In a preferred embodiment, a slit manifold is used to create the extrudate sheet that is to be shaped into a finished EHB product, wherein said slit manifold may have symmetrical or asymmetrical die outlet. In a preferred embodiment, an asymmetrical die outlet is used to create features such as "tongue and groove," slots, depressions, linear scoring, ridges, waves, thicker or thinner sections, angles, profiles, etc. For example, the asymmetrical die outlet may be configured to mold an extrudate optimized for furniture construction into a finished EHB product having the shape of furniture frame components, which can used to replace plywood or OSB, resulting in furniture that is less expensive to produce and results in lower waste.

Blends of hemp feedstocks of varying sizes can impart the previously mentioned benefits that feedstocks having only minimal size ranges might not produce due to a wider variety of bonding. For example, where blends of the hemp bast fiber and hemp hurd contain variable lengths (potentially not discernible to the human eye, but as measured in microns), micronized hemp bast fiber and micronized hemp hurd will fill in voids (voids being defined as areas where there is significantly more binder material than hemp feedstock as observed under a microscope) between larger hemp bast fibers or hemp hurd to create a hemp composite material with increased strength and fewer defective areas due to a more consistent hemp-binder matrix. Additionally, orientation of dispersed/distributed hemp bast fiber and/or hemp hurd of various lengths within the extruded composite will create product advantages when the machine direction versus transverse direction of the final product is considered since it will result in a final product with increased flexural modulus, increased tensile strength, and natural UV inhibition.

The amount of hemp feedstock as a percentage of the extrudate depends on the targeted end use application of the EHB. The desired material and board performance are achieved based on the increase or decrease in all the various feedstock combinations plus the impact of the board thickness. For example, boards of a thinner design may have a higher hemp bast fiber to hemp hurd ratio combined with a harder binder material to achieve a balance of impact resistance, fastener retention, and flexural modulus. Boards of a thicker design and comprising a softer binder could achieve the same desired properties with an increased hemp hurd content and lower fiber content, assuming highly effective dispersion and a broad array of hurd sizes are used (for instance, ranging from 5 micron to 16 mm). Types of materials that may act as the binder material include, but are not limited to, starch-based binders, polymers, polyester resin, epoxy resin, polyurethane resin, ISO resin, vinyl ester resin, and methyl ethyl ketone peroxide (MEKP). In a preferred embodiment, a finished EHB product preferably comprises at least 30% binder material. In comparison, typical oriented strand board (OSB) contains only 5% to 10% binder resulting in a much lower encapsulation of the wood particles.

Some embodiments of a finished EHB product may further comprise secondary feedstocks and/or chemical treatment of the hemp feedstocks. Secondary feedstocks may be added to the hemp feedstocks and binder material to optimize a finished EHB product so that it has physical/mechanical properties designed for a specific purpose. Types of secondary feedstocks that may be used to optimize a finished EHB product include, but are not limited to, bio-derived carbon, gypsum, glass fiber, wood fines, blowing agents, additive flame retardants, anti-static agents, antimicrobial agents, coupling agents, or any combination thereof. Blowing agents may be defined as an additive used to produce a cellular structure within the finished EHB product by causing a foaming process within the extrudate before or after it is ejected from the extruder. The cellular structure resulting from the use of blowing agents decreases density and price of a blown, finished EHB product as well as increases the insulative properties of such blown, finished EHB products.

Flame retardants may be defined as secondary feedstocks designed to inhibit/prevent the ignition of the binder material and/or hemp feedstocks of the finished EHB product. In a preferred embodiment, flame retardants suppress the ignition of the binder material and/or hemp feedstocks by creating a layer of charring on the outer surface of the finished EHB product when said finished EHB product is exposed to heat and/or a flame. In a preferred embodiment, red phosphorus is incorporated during the extrusion process and may act as a flame retardant. Anti-static agents may be defined as secondary feedstocks designed to reduce the static retention of the finished EHB product. In a preferred embodiment, carbon may be used as the antistatic agent. Types of carbon that may be used as an antistatic agent include but are not limited to a bio-based carbon, graphene, carbon nanotubes, carbon fibers, carbon black, graphite, or any combination thereof.

UV stabilization agents may be defined as secondary feedstocks that combat the deterioration of the binder material and significantly extend the life span of the finished EHB product by inhibiting the photo oxidation process. UV stabilization agents may be effective at only 0.1-0.5% by weight relative to the weight of the binder material and can be added during the extrusion process. In a preferred embodiment, types of secondary feedstocks that may be used as the UV stabilization agent include, but are not limited to, UV absorbers, quenchers, hindered amine light stabilizers, or any combination thereof. Antimicrobial agents may be defined as secondary feedstocks designed to prevent the growth of bacteria, microbes, and other organic growth that may reduce the effective lifetime of the finished EHB product. In a preferred embodiment, an antimicrobial additive is applied to the finished EHB product after extrusion. However, some embodiments of the finished EHB product may comprise antimicrobial additives that are added during the extrusion process. In a preferred embodiment, metal nanoparticles may be used as a secondary feedstock that act as an antimicrobial agent and may be added to the hemp feedstock and binder material during the extrusion process. In some preferred embodiments, colorants may be added during the extrusion process to assist with the identification of a finished EHB product, reduce the number of labor steps during construction, increase thermal stability, etc.

Secondary feedstocks in the form of materials obtained from various waste streams may also be used as secondary feedstocks. By including materials from industrial/residential waste streams, a finished EHB product may have a reduced cost and a positive environmental impact. In a preferred embodiment, materials obtained from waste streams and used as secondary feedstocks include, but are not limited to, wood fines, bio-carbon, gypsum, glass fiber, post-consumer/industrial plastics, or any combination thereof. The use of post-consumer/industrial plastic may be particularly useful for a finished EHB product optimized for applications in which slight reductions in physical and mechanical properties due to the degradation of the polymeric material are acceptable. Additionally, the environmental benefits of the said foamed, finished EHB product are superior to that of gypsum board due to the waste usage and carbon capture advantages of the hemp plant. For example, finished EHB products optimized for decking board and/or fencing board applications are preferably made from post-consumer/post-industrial recycled thermoplastics and thermoplastics, or a blend of other highly loaded recycled materials plus small amounts of virgin material to increase flow rates. For instance, a finished EHB product may incorporate bio-carbon obtained via pyrolysis, resulting in carbon neutral/negative construction material.

Finished EHB product combinations have superior physical properties when compared to traditional construction boards like OSB, plywood, drywall, and treated lumber in every building application. For example, a finished EHB product optimized for use as a low-profile subfloor under carpet may comprise approximately 30% by volume hemp feedstock and 70% by volume non-polar, virgin polymer binder. The resulting finished EHB product possesses superior moisture resistance, thermal/hydraulic stability, edge strength, stiffness, impact strength, and sound deadening properties when compared to that of OSB or plywood. For example, as illustrated in Table 5, a finished EHB product optimized for use as low-profile roof board may comprise approximately 70% by volume hemp feedstock and 30% by volume non-polar, virgin polymer binder. The resulting finished EHB product (RB7) possesses superior moisture resistance, thermal/hydraulic stability, edge strength, stiffness, impact strength, and sound deadening properties when compared to that of OSB and plywood. For example, as illustrated in Table 7, a finished EHB product optimized for use as exterior sheathing may comprise approximately 45% by volume hemp feedstock and 55% by volume non-polar, virgin polymer binder. The resulting finished EHB product (EW3) possesses superior moisture resistance, thermal/hydraulic stability, edge strength, stiffness, impact strength, and sound deadening properties when compared to that of the traditional construction boards.

In some embodiments, finished EHB products may be optimized as ordered components that make up a part of a structure and/or frame. These ordered components are preferably configured to fit together in a very specific manner, and may include, but are not limited to, boards, beams, flooring, wallboard, duct liner, duct board, roof board, decking, and fencing. Finished EHB products optimized for boards, beams, decking, and/or fencing may be expected to perform better than wood boards due to a higher water and pest resistance. More consistent "grain," resulting from the dispersive mixing, disruptive mixing, and fiber/chain alignment, should also reduce the likelihood of warping that boards, beams, decking, and/or fencing sometimes experience.

Once the extrudate sheet has been pushed through the die outlet, it may be further shaped and gradually cooled by the downstream extrusion arrangement. The downstream extrusion arrangement may comprise a plurality of rollers, heater/coolers, cutters, molders, sanders, planers, painters, and stacker. Initial sizing past the manifold may be accomplished via the plurality of rollers that compress the extrudate sheet to the desired thickness and/or corrugate the extrudate sheet with a desired texture. The downstream extrusion arrangement may be used to form patterns on one or more surfaces of the extrudate sheet while it is still pliable and/or form molded shapes, such as base architectural molding, crown architectural molding, ceiling molding, and corner architectural molding. Additionally, the planers, sanders, routers, etc. of the downstream extrusion arrangement may be used to transform the sides of the extrudate sheet into interlocking edges. The downstream extrusion arrangement may also be used to create texture to increase bonding of laminates, paper, films, paint, tar, wax, glue, or any combination thereof that is applied to the surface of the extrudate sheet. In other embodiments, the downstream extrusion arrangement may be used to create channels located on the bottom surface of the extrudate sheet and sized in a way such that electrical hardware, plumbing, and radiant heating may installed in the channels.

An optional fastener may be used to fasten the finished EHB product to a frame and/or structure. The optional fastener preferably comprises a cylindrical body comprising a trailing end, advancing end, and proximal portion having plurality of barbs, wherein the head of the optional fastener is located at the trailing end and generally has a larger radius than the plurality of barbs located on the proximal portion. The proximal portion of the optional fastener may have a fixed diameter, or it may have a varied diameter. This may allow a user to implant an optional fastener without the need of predrilling a hole into the building frame in which the optional fastener is to be placed. The plurality of barbs of the proximal portion may vary in form, angle, and depth, depending on the need. A washer may be used in combination with the optional fastener to reduce water penetration into the finished EHB product. For instance, some embodiments of the washer may comprise a water-resistant material such as rubber and silicon which may seal the area in which optional fastener penetrates into the finished EHB product.

Due to the use of recycled materials and sustainable hemp feedstocks, the various finished EHB products described herein will result in a tremendous benefit to the overall environment when evaluated through a life cycle analysis (LCA). Finished EHB products under LCA will show that by using sustainable hemp feedstocks, reclaimed "waste" materials from other construction and manufacturing processes, reduced shipping weights, and streamlined processing will dramatically offset the carbon offenses in the construction industry, and provide permanent carbon sequestration opportunities that currently do not exist in available construction materials. Additionally, the finished EHB products described may include carbonized materials by way of secondary feedstocks, allowing for high carbon sequestration crops, such as hemp and/or bamboo, to be grown and turned into bio-carbon via pyrolysis before incorporation into the finished EHB products as a carbon sink. As such, when compared with traditional construction materials, the LCA will show that the finished EHB products described herein are not only superior in terms of carbon capture, lifespan, and physical properties but are also more sustainable.

The foregoing summary has outlined some features of the system and method of the present disclosure so that those skilled in the pertinent art may better understand the detailed description that follows. Additional features that form the subject of the claims will be described hereafter. Those skilled in the pertinent art should appreciate that they can readily utilize these features for designing or modifying other methods for carrying out the same purpose of the methods disclosed herein. Those skilled in the pertinent art should also realize that such equivalent modifications do not depart from the scope of the methods of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. The term "hemp feedstocks" and grammatical equivalents thereof are used herein to mean the hemp hurd and hemp bast fiber obtained from hemp plants via processing. For example, a hemp-based composite board may comprise a feedstock having at least one of hemp hurd, hemp bast fiber, and lignin which may all be combined with a binder to create the extrudate that forms the extrudate sheet. The term "distributive mixing" may be defined as the physical process of blending two feedstocks such that the physical separation distances are reduced to scale where diffusion can occur, leading to a more homogenous extrudate. The term "dispersive mixing" may be defined as the break-up of the minor components of a mixture into smaller size particles, which increases encapsulation of feedstocks in binder material.

Figure 1:
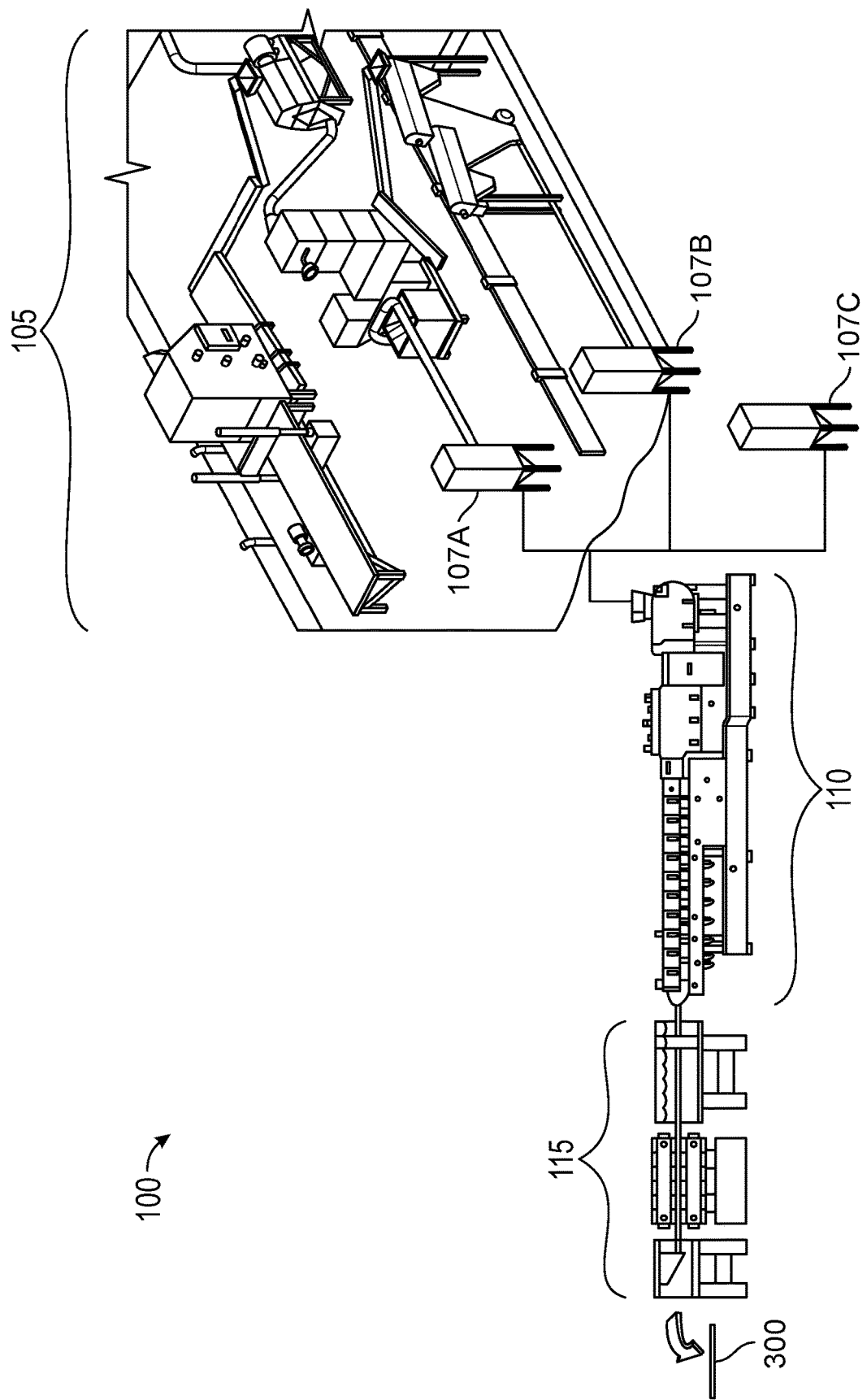
FIG. 1 illustrates a system configured to produce a finished EHB product and embodying features consistent with the principles of the present disclosure.
Figure 2A:
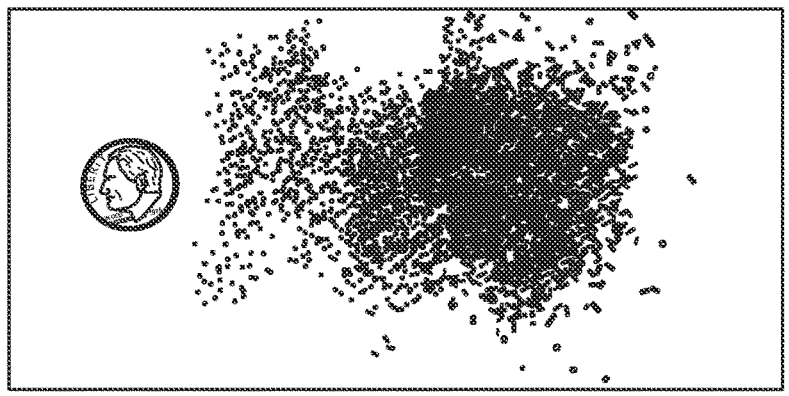
FIG. 2A illustrates hemp feedstock embodying features consistent with the principles of the present disclosure.
Figure 2B:
FIG. 2B illustrates hemp feedstock embodying features consistent with the principles of the present disclosure.
Figure 2C:
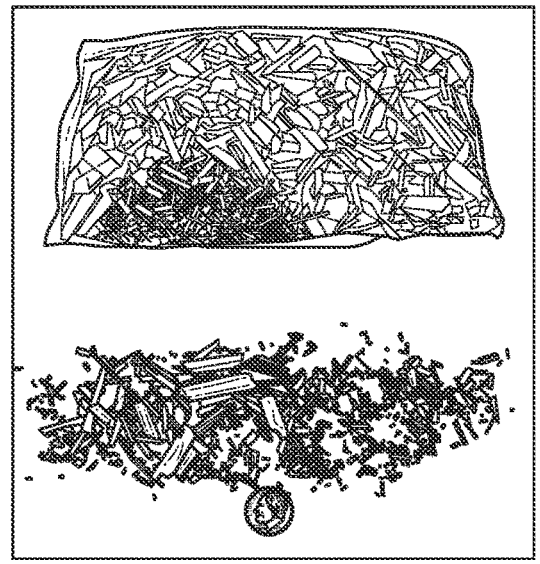
FIG. 2C illustrates hemp feedstock embodying features consistent with the principles of the present disclosure.
Figure 3A:
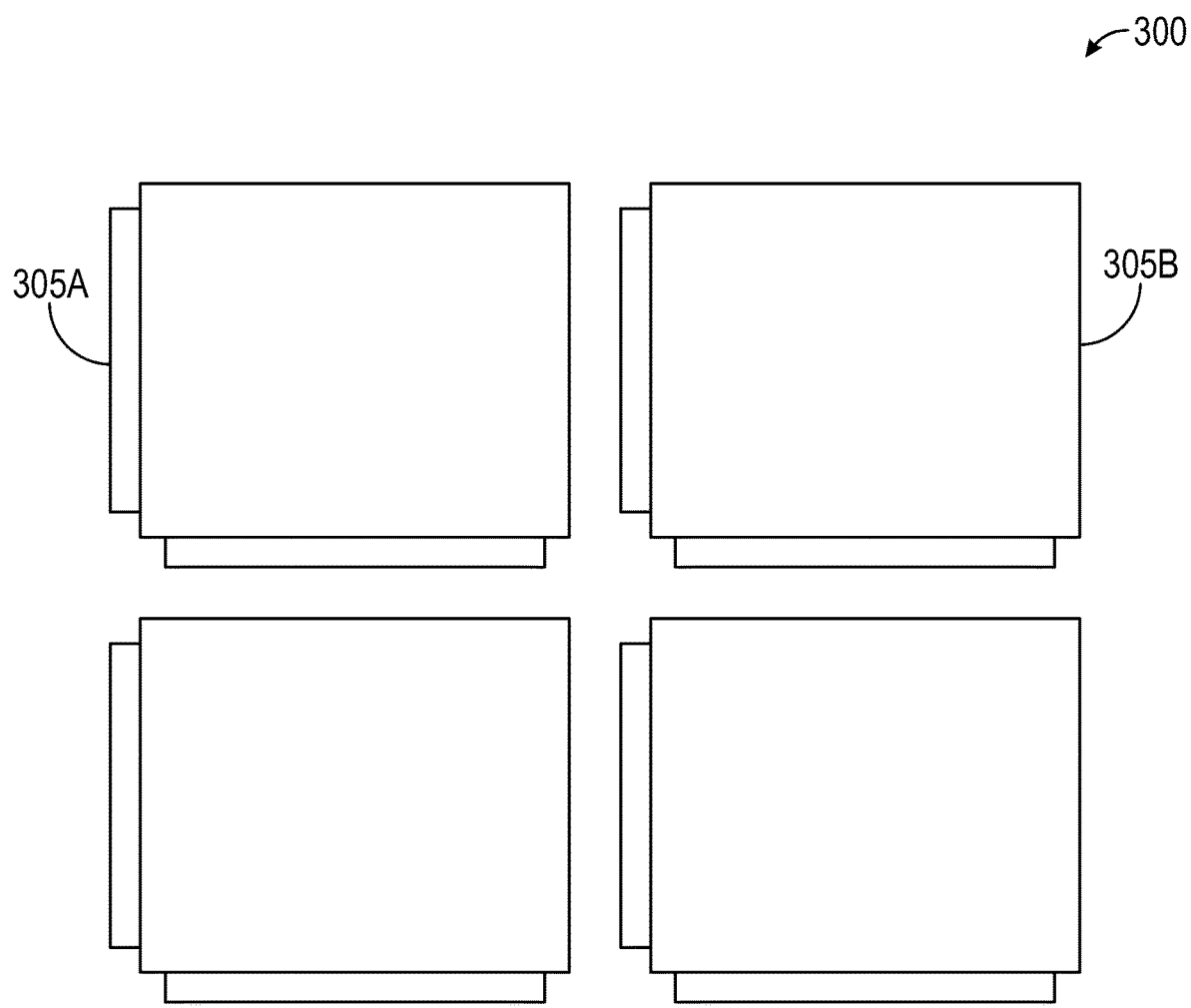
FIG. 3A illustrates a top view of a finished EHB product embodying features consistent with the principles of the present disclosure.
Figure 3B:
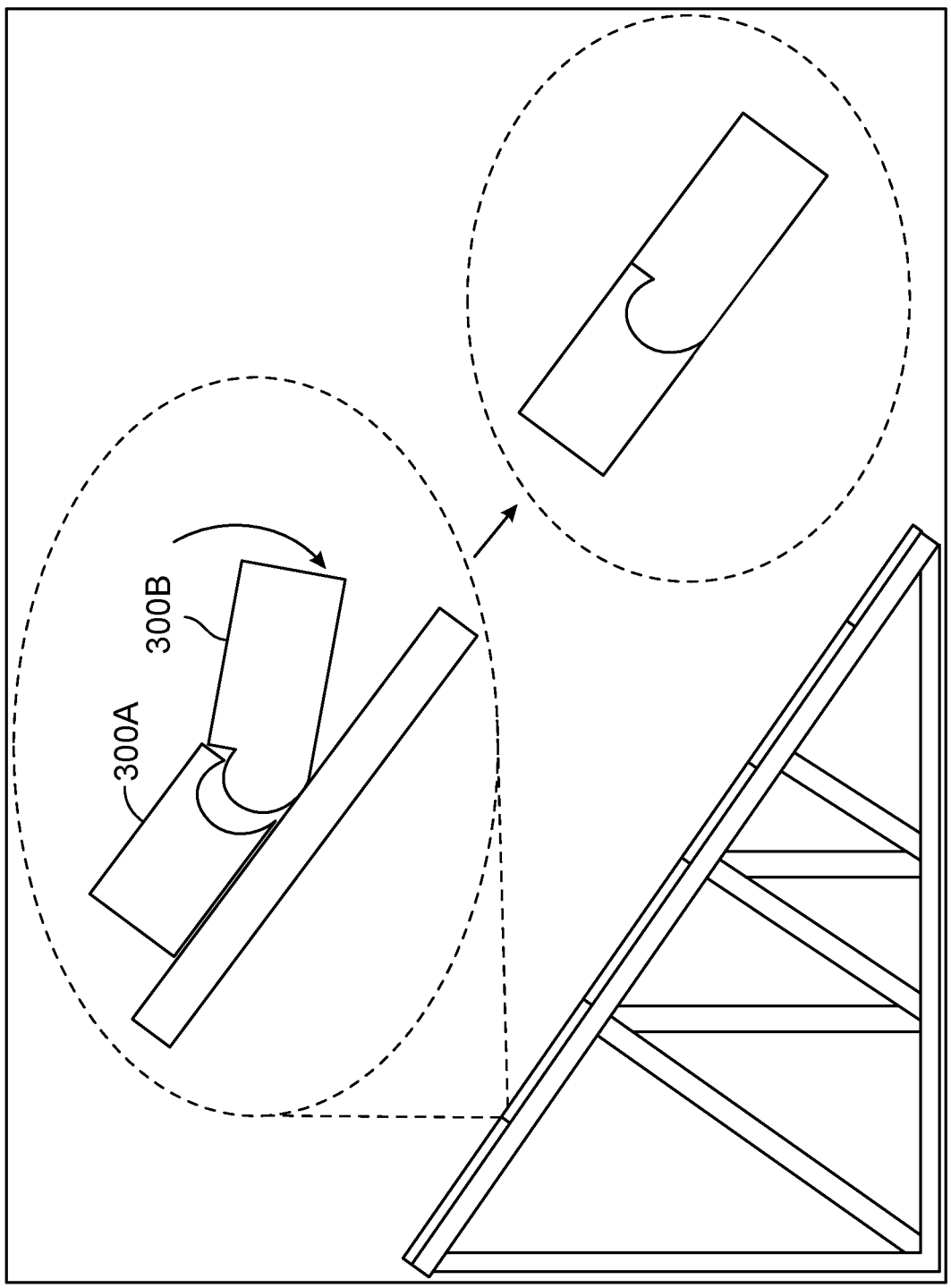
FIG. 3B illustrates a top view of a finished EHB product embodying features consistent with the principles of the present disclosure.
Figure 3C:
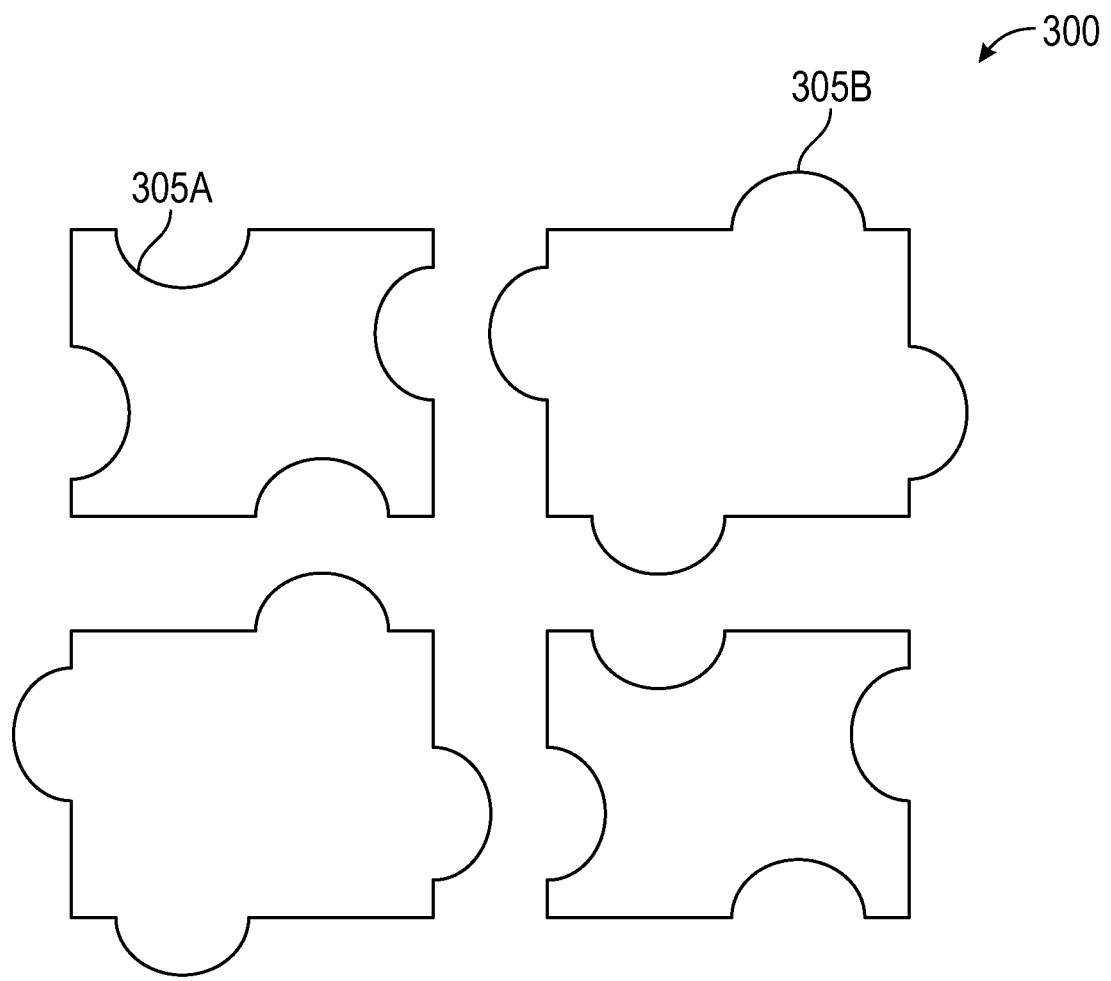
FIG. 3C illustrates a top view of a finished EHB product embodying features consistent with the principles of the present disclosure.
Figure 4:
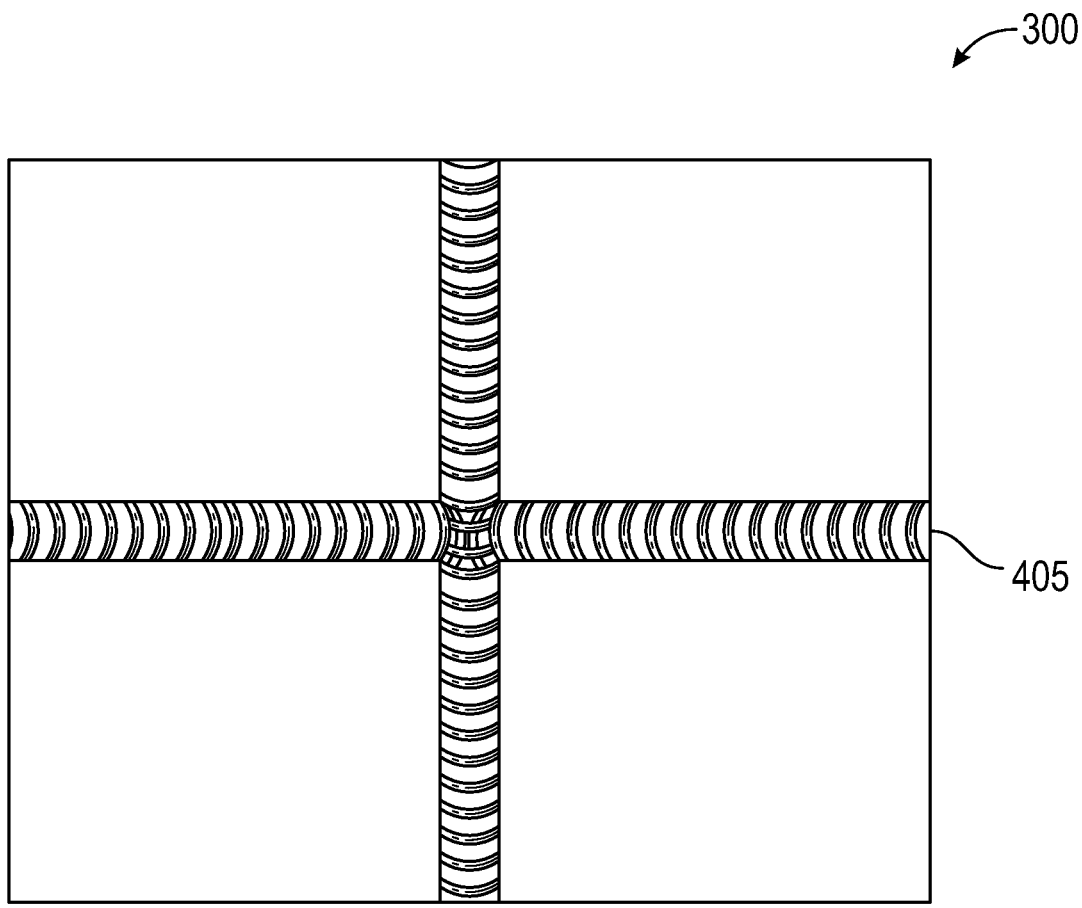
FIG. 4 illustrates a bottom view of a finished EHB product embodying features consistent with the principles of the present disclosure.
Figure 5:
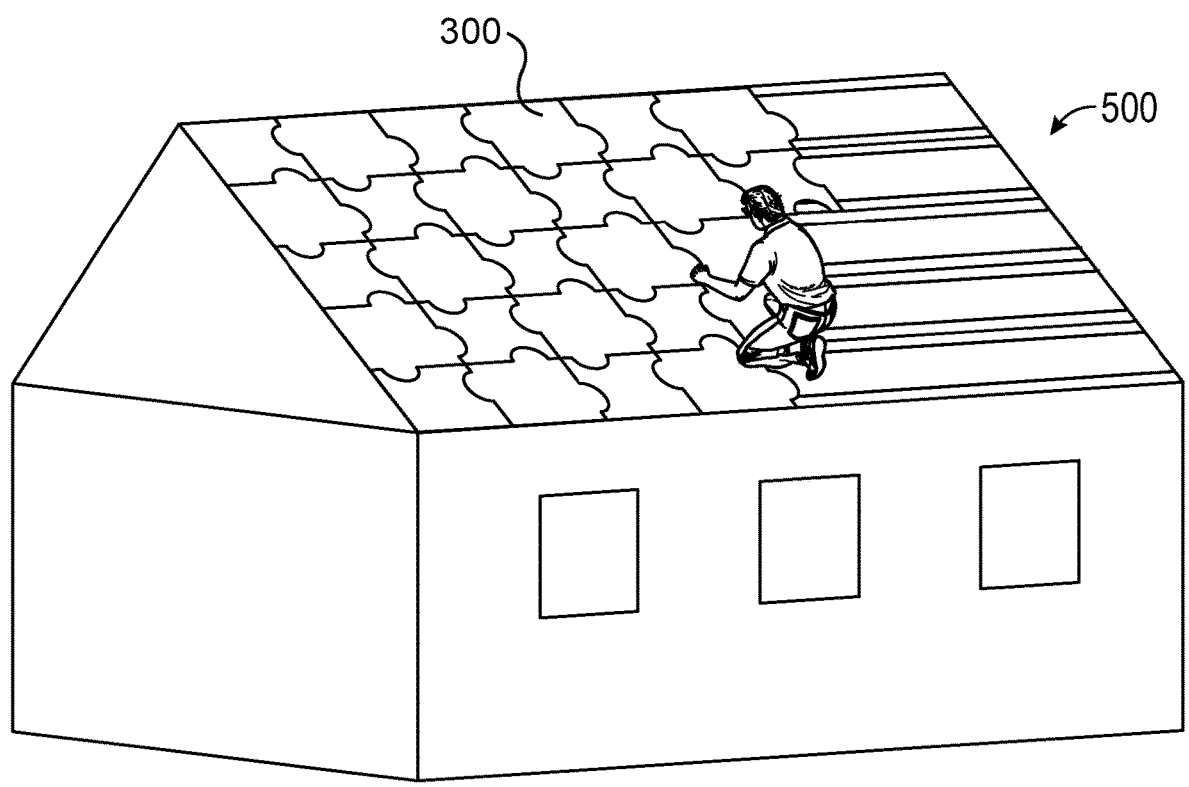
FIG. 5 illustrates an environmental view of a finished EHB product embodying features consistent with the principles of the present disclosure.
Figure 6:
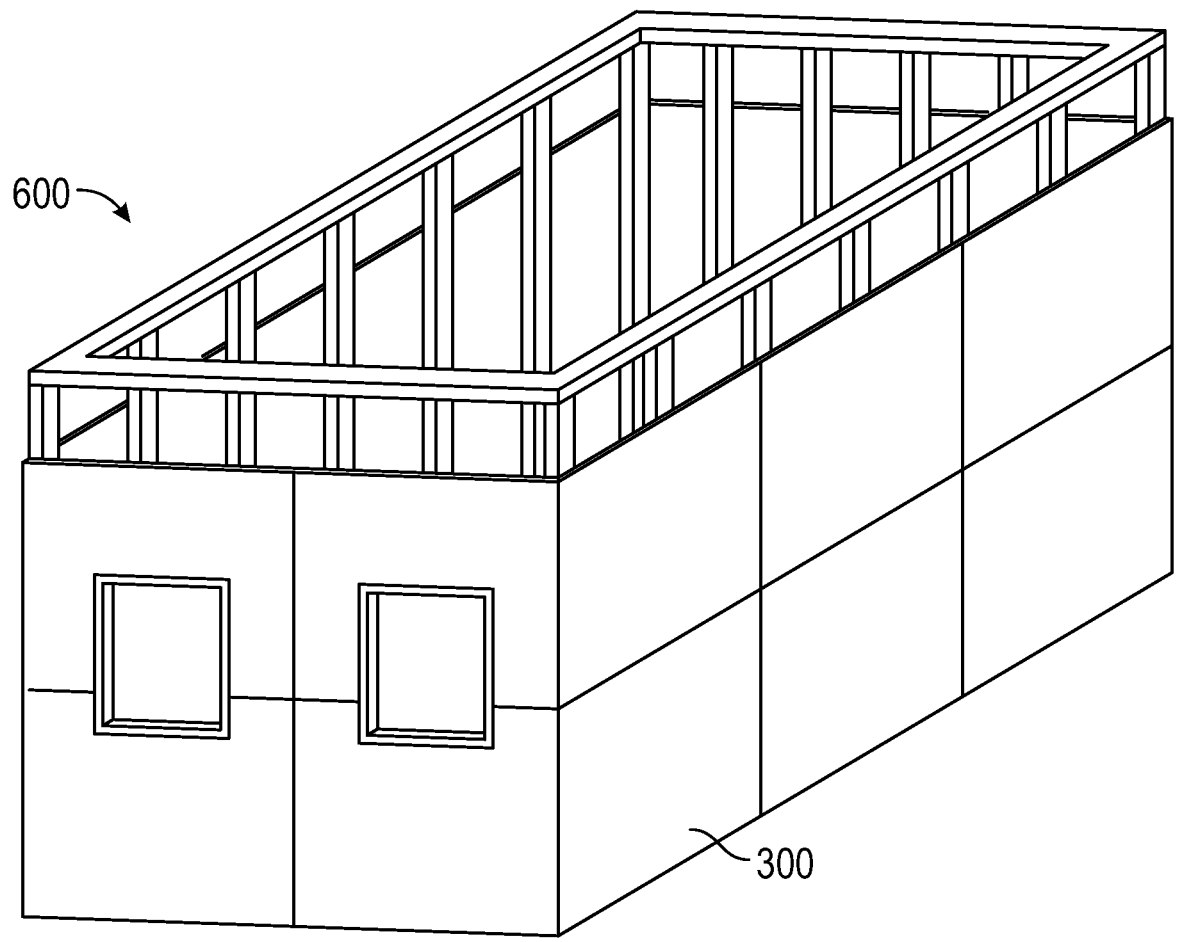
FIG. 6 illustrates an environmental view of a finished EHB product embodying features consistent with the principles of the present disclosure.
Figure 7:
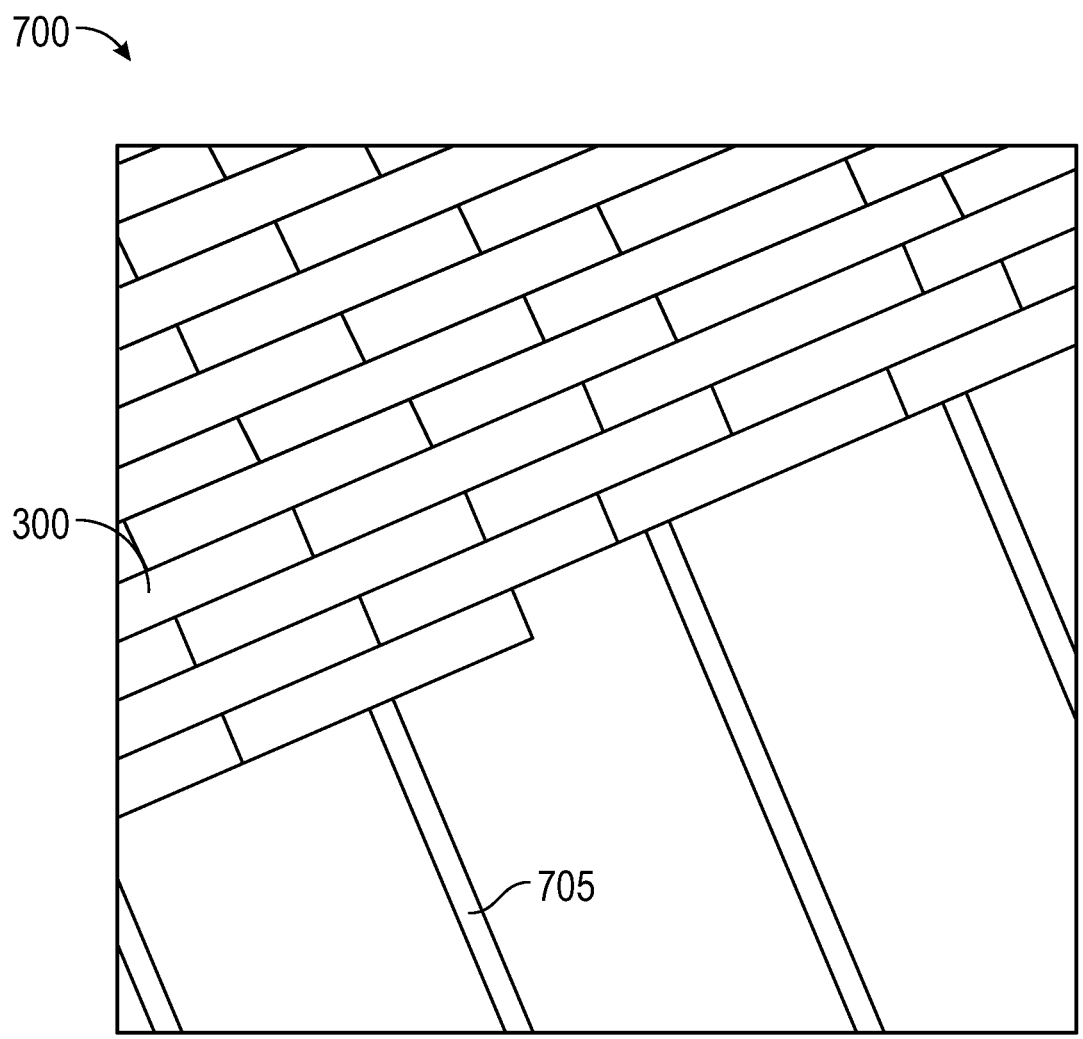
FIG. 7 illustrates an environmental view of a finished EHB product embodying features consistent with the principles of the present disclosure.
Figure 8:
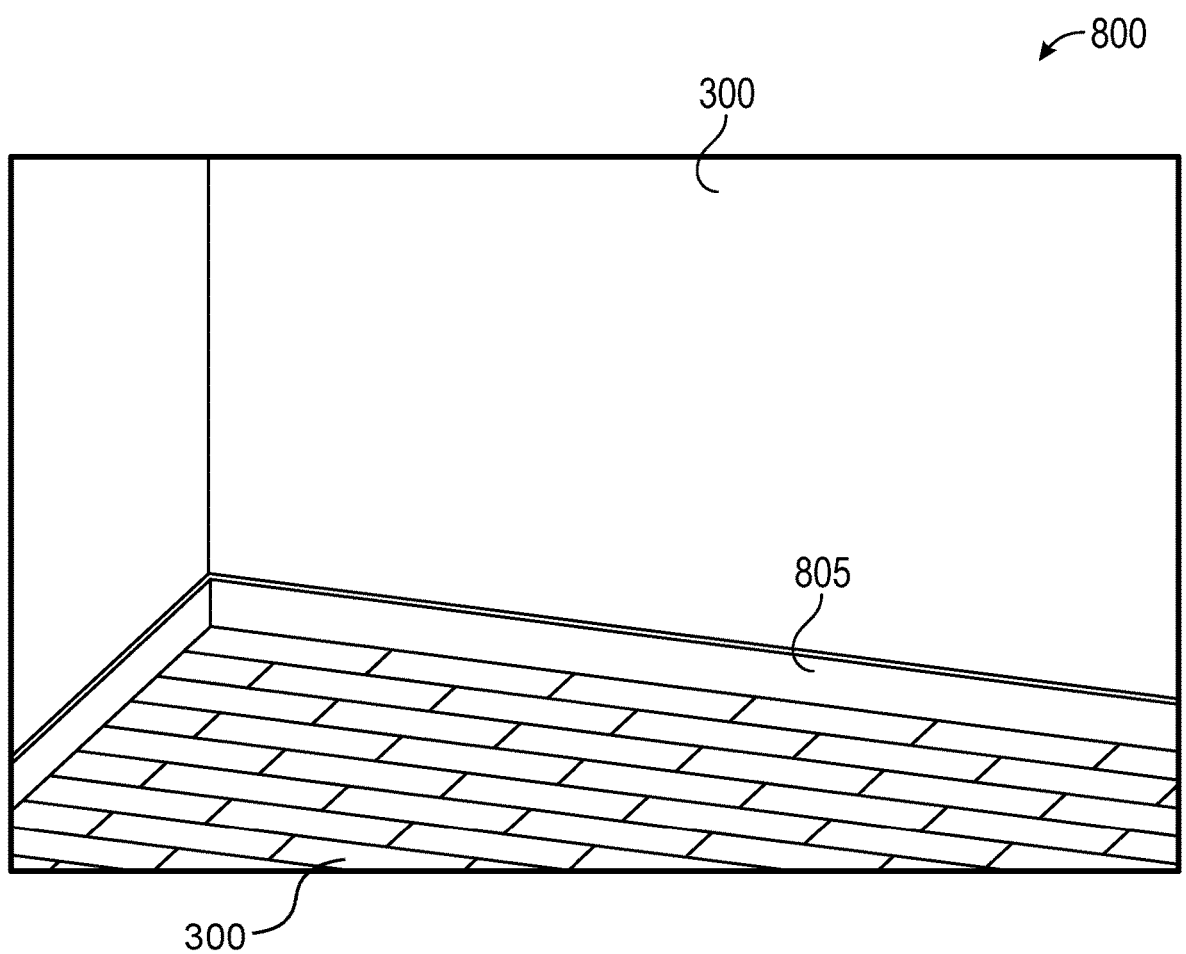
FIG. 8 illustrates an environmental view of a finished EHB product embodying features consistent with the principles of the present disclosure.
Figure 9A:
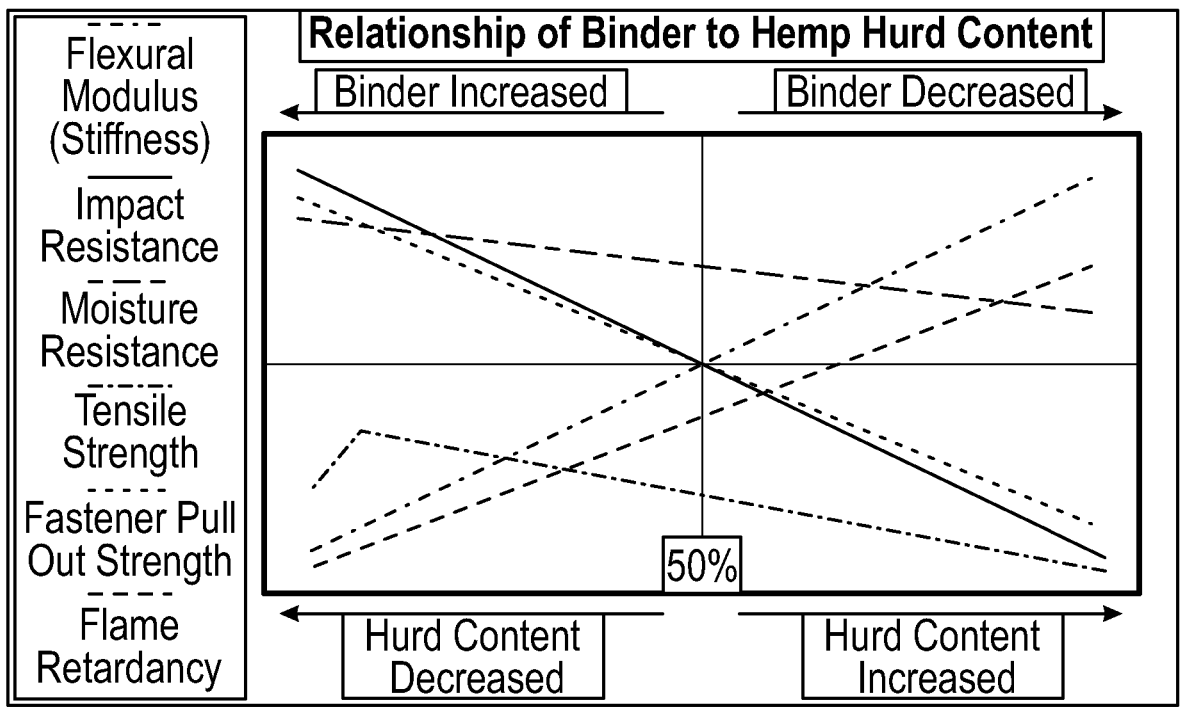
FIG. 9A is a chart illustrating physical properties of EHB as a function of the amount of hemp bast fiber relative to the amount of binder material used to produce said EHB.
Figure 9B:
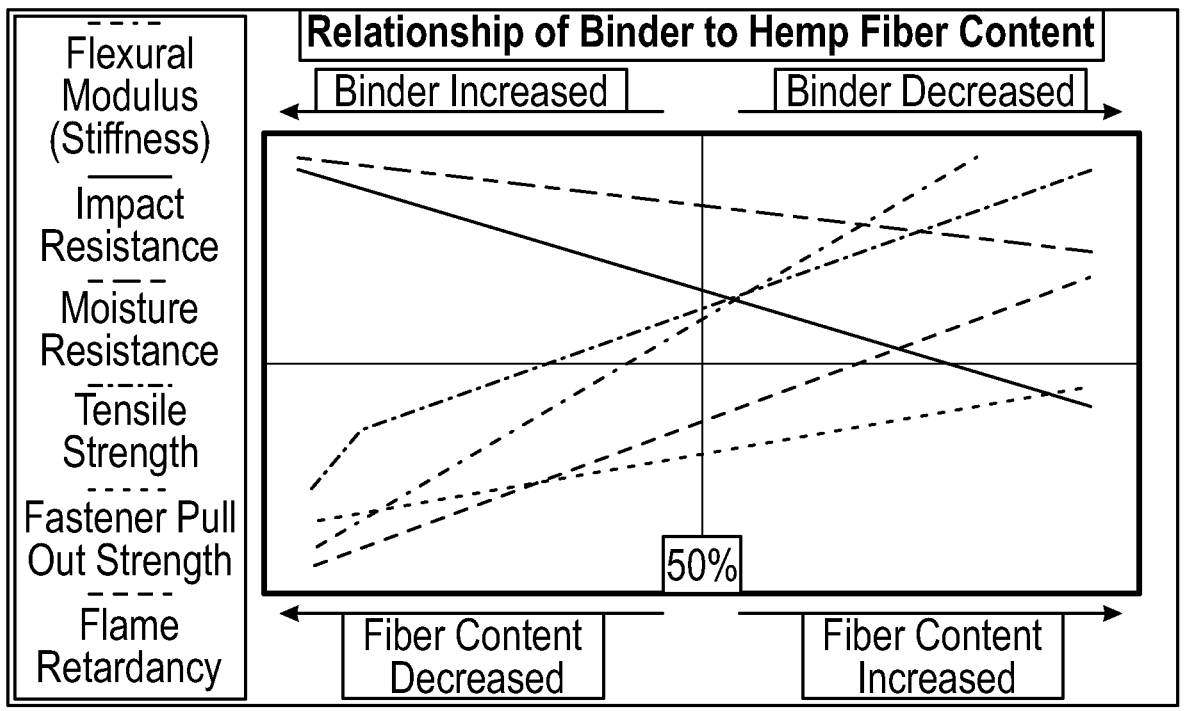
FIG. 9B is a chart illustrating physical properties of EHB as a function of the amount of hemp hurd relative to the amount of binder material used to produce said EHB.
Figure 10:
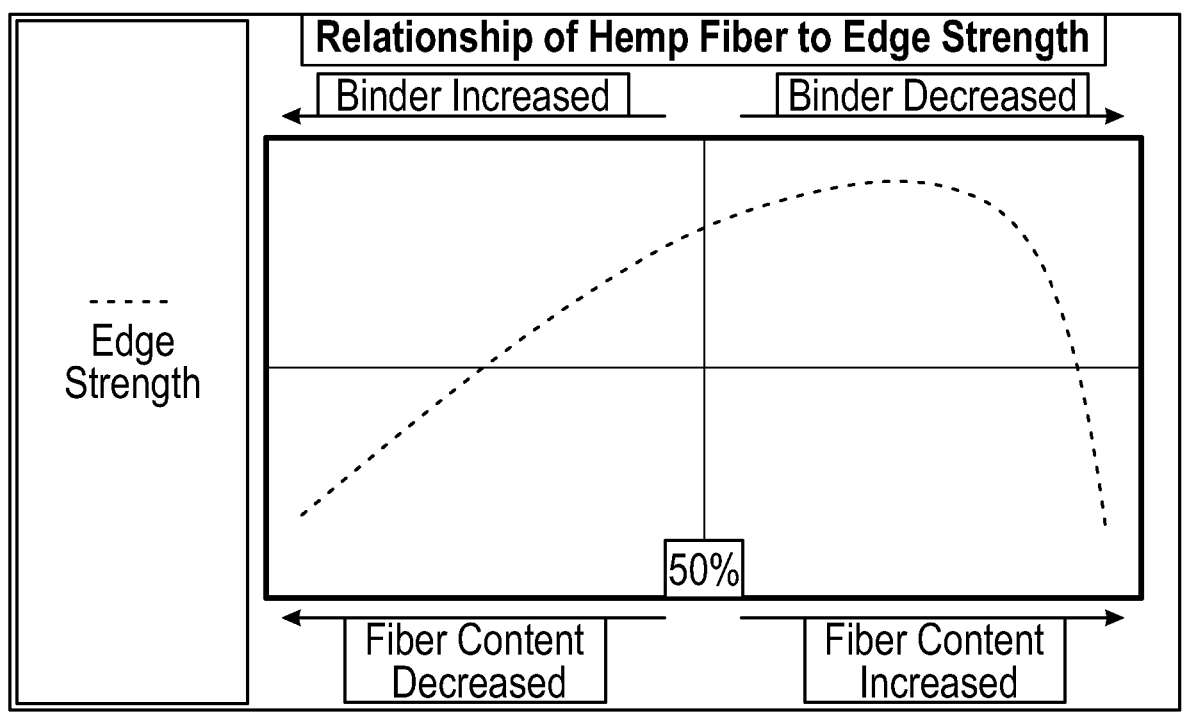
FIG. 10 is a chart illustrating edge strength of EHB as a function of the amount of hemp bast fiber used to produce said EHB.
Figure 11:
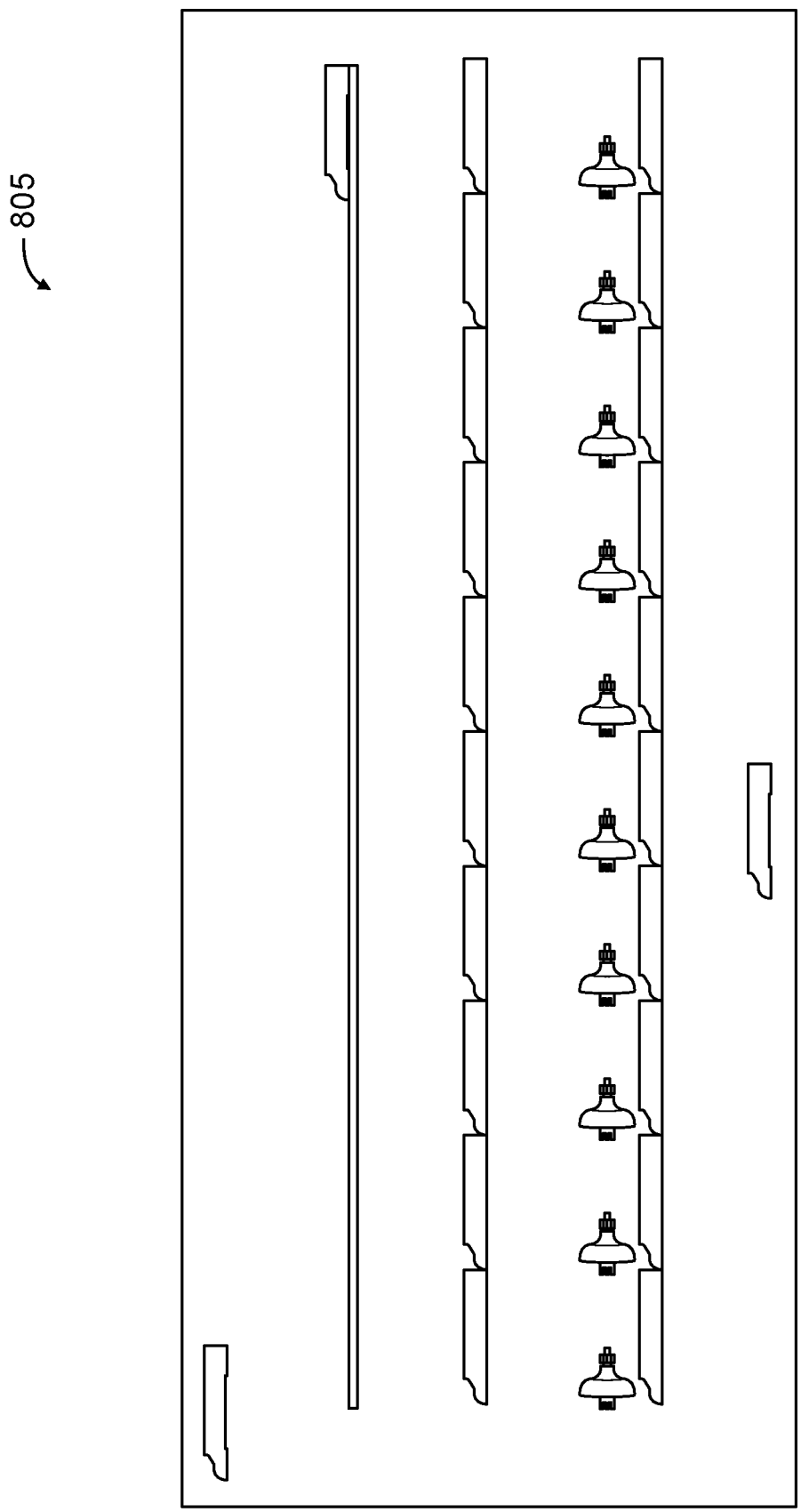
FIG. 11 illustrates at least one molded shape that may be incorporated into a finished EHB product and embodying features consistent with the principles of the present disclosure.
Figure 12:
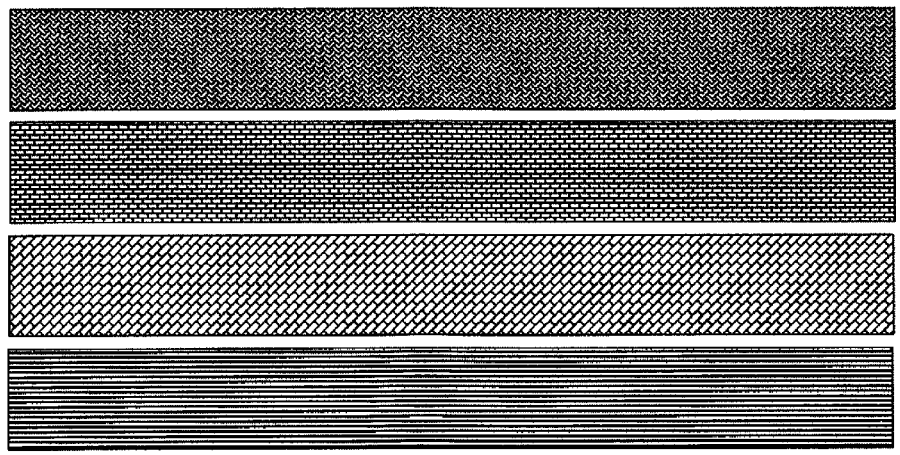
FIG. 12 illustrates a top view of an extrudate sheet comprising a pattern and embodying features consistent with the principles of the present disclosure.
Figure 13:
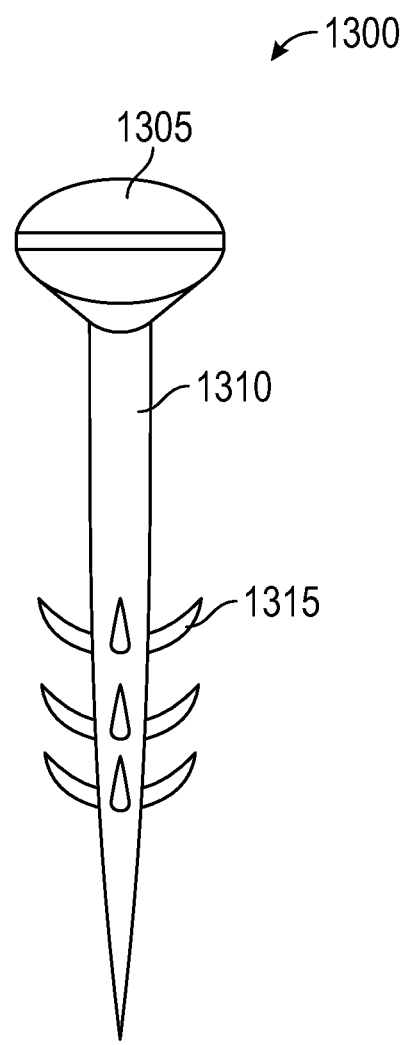
FIG. 13 illustrates a perspective view of an optional fastener embodying features consistent with the principles of the present disclosure.
Figure 14:
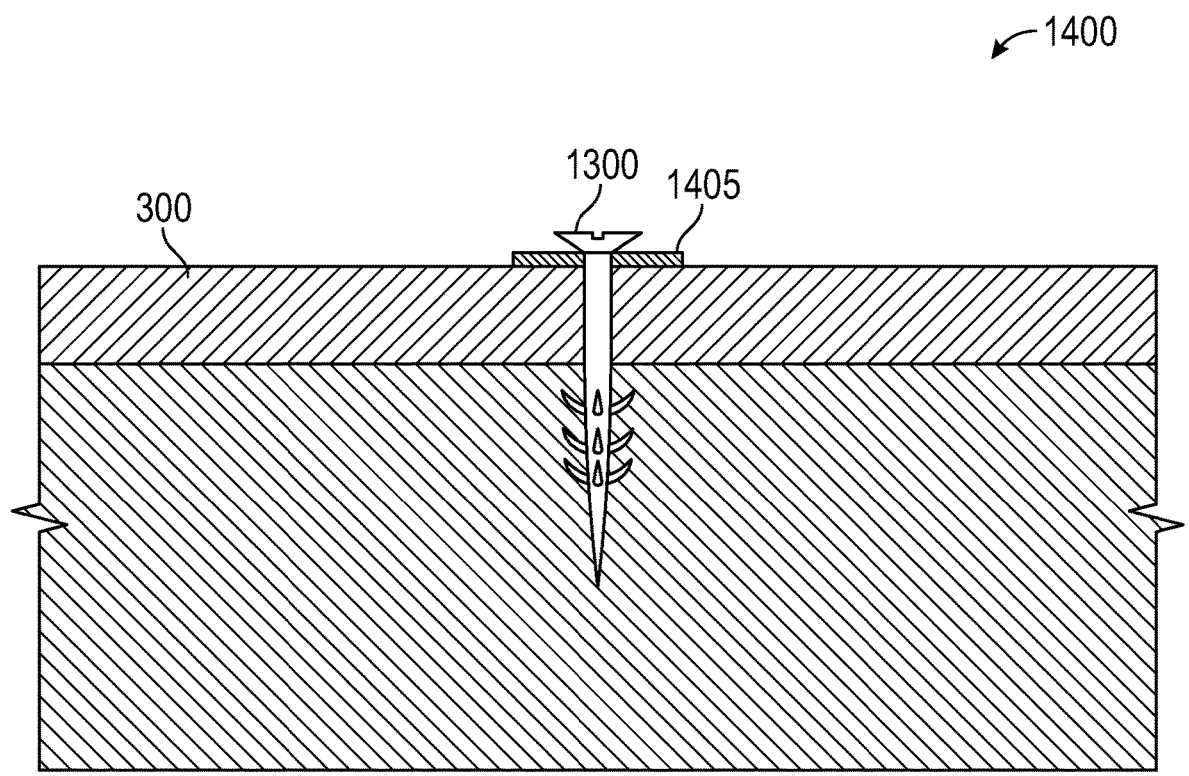
FIG. 14 illustrates an environmental view of an optional fastener embodying features consistent with the principles of the present disclosure.
Figure 15:
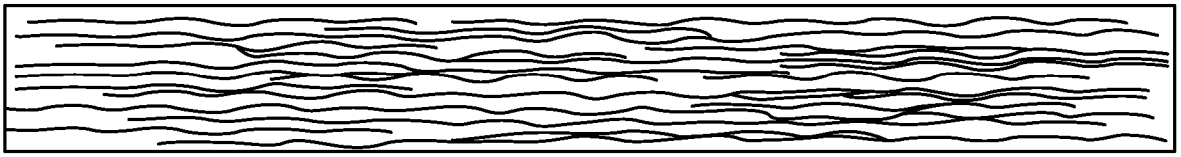
FIG. 15 illustrates the hemp bast fiber alignment within the binder material and embodying features consistent with the principles of the present disclosure.
Figure 15:
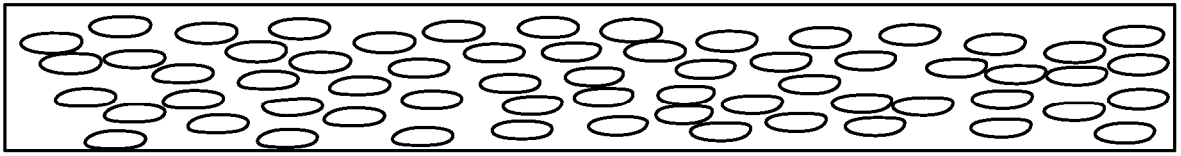
Figure 15:
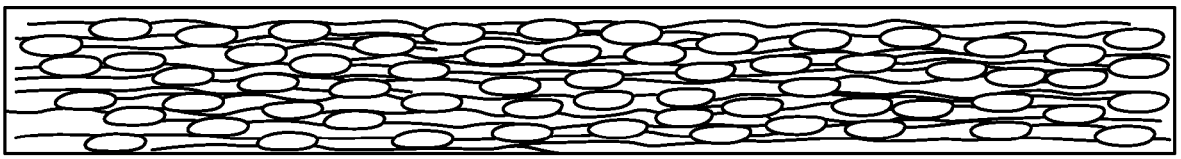
Figure 15:
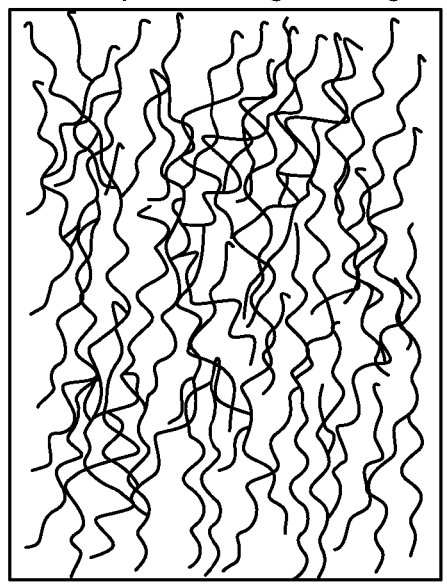

FIGS. 1-15 illustrate embodiments of a final mono-extruded hemp composite board (EHB) product used as a replacement for floor boards, roof boards, exterior walls, and interior walls. FIG. 1 is an exemplary diagram of a system 100 that may be used to produce a finished EHB product 300, wherein said system 100 generally comprises a separation arrangement 105, upstream extrusion arrangement 110, and downstream extrusion arrangement 115. FIGS. 2A-2C illustrate different sizes of hemp feedstocks that may be used to produce a finished EHB product 300. FIGS. 3A-3C illustrate top views of finished EHB products 300 comprising various forms of interlocking panels. FIG. 4 illustrates a bottom view of a finished EHB product 300 comprising channels 405 specifically designed for the installation of electrical hardware, plumbing, radiant heating 705, etc. FIG. 5 illustrates a first environmental view 500 of a finished EHB product 300 serving as the decking for a roof. FIG. 6 illustrates a second environmental view 600 of a finished EHB product 300 serving as the structural sheathing for a building. FIG. 7 illustrates a third environmental view 700 of a finished EHB product 300 comprising channels 405 and installed with radiant heating 705 to create heated flooring. FIG. 8 illustrates a fourth environmental view 800 of a finished EHB product 300 comprising at least one molded shape 805 and used as wallboard in the interior of a structure. FIGS. 9A and 9B depict how physical properties of a finished EHB product 300 may be altered by changing the amount of hemp feedstock used relative the amount of binder material 107C. FIG. 10 depicts how edge strength of a finished EHB product 300 may be altered by changing the amount of hemp bast fibers 107A relative the amount of binder material 107C. FIG. 11 illustrates at least one molded shape 805 that may be incorporated into a finished EHB product 300. FIG. 12 illustrates an extrudate sheet before and after the application of a pattern 1200. FIG. 13 illustrates an optional fastener 1300 that may be used to secure a finished EHB product 300 to a building structure. FIG. 14 illustrates a fifth environmental view 1400 of an optional fastener 1300 used to secure a finished EHB product 300 to a building structure. FIG. 15 illustrates the alignment of hemp feedstocks within the extrudate sheet after ejection of the extrudate from the upstream extrusion arrangement 110. It is understood that any method steps associated with a method described in the present disclosure may be carried out by a user using the system illustrated in FIGS. 1, 3-8, and 11-15.

As illustrated in FIG. 1, the process of making a finished EHB product 300 involves processing and separating hemp biomass into hemp feedstocks, primarily that of hemp bast fiber 107A and hemp hurd 107B, via the separation arrangement 105 before combining said hemp feedstocks with a binder material 107C preferably natural binder, thermoplastic, thermoset polymer, and/or epoxy resin via the upstream extrusion arrangement 110 to create an extrudate that is subsequently molded and processed into a final product having the desired characteristics defined by the downstream extrusion arrangement 115. The extrudate created within the extruder of the upstream extrusion arrangement 110 is pushed through a die where the shape is formed via said extrusion arrangement into an extrudate sheet and modified via post extrusion processing until the finished EHB product 300 is obtained. The amount of hemp biomass relative to the binder is the primary variable that determines the various physical/mechanical properties of the finished EHB product 300 and allows for the finished EHB product 300 to be customized for the desired application. In a preferred embodiment, the finished EHB product 300 is configured to have interlocking panels, which increases structural stability and reduces the chance of moisture, fungus, mold, and pests penetrating into the resulting structure. Further customization via the use of chemical treatments and secondary feedstocks may be used to create highly customized, anisotropic composite materials for use in a wide range of applications.

The hemp feedstocks used to produce a finished EHB product 300 are obtained by processing hemp stalks. In a preferred embodiment, as illustrated in FIG. 1, the separation arrangement 105 comprises an opener, shredder, screener, and a series of separation equipment configured to decompress, segregate, and screen, said hemp biomass, respectively into its various components, primarily hemp hurd 107B and hemp bast fiber 107A. In embodiments where only shorter hemp bast fibers 107A or hemp hurd 107B are desirable, processing machinery may be used to convert all the longer bast fibers and hurd into shorter components having a maximum desired length. Due to the nature of processing natural materials, as in hemp feedstocks, an inconsistent range of product lengths for the hemp hurd 107B and hemp bast fiber 107A can be expected. The processing of the hemp biomass using currently available commercial equipment, will result in hemp feedstocks with a range of lengths and widths that are outside of specification targets.

For example, FIG. 2A illustrates a first pass of hurd material produced from the decortication stage of the processing line, resulting in a size variance outside the specification range that are as small as 5 microns to as large as 30 millimeters. For example, FIG. 2B illustrates a first pass of hurd material produced from the decortication stage of the processing line but with an increased dwell time, resulting in a size variance where the range can be small as 5 microns to as large as 30 millimeters. For example, FIG. 2C illustrates a first pass of hurd material produced from the decortication stage of the processing line but with an increased dwell time as well as hammer milling, resulting in a size variance can be small as 5 microns to as much as 500 microns. Therefore, it is likely that the hemp feedstocks can have a large variance in size unless a screening method is used to separate the hemp feedstocks into narrower size ranges, which by nature will reduce the range of sizes, but may never completely remove the variability in size. Once the hemp has been processed into the desired feedstocks, these hemp feedstocks are transferred to an extrusion arrangement along with a binder material 107C to create the extrudate that will be used to form the extrudate sheet that is subsequently transformed into the finished EHB product 300. In a preferred embodiment, secondary feedstocks are also added to the extruder to create the finished EHB product 300.

Though the feedstocks may be added directly to the upstream extrusion arrangement 110 without mixing (due to the mixing that occurs within the extruder), in some preferred embodiments of the system may mix and/or blend the hemp feedstocks prior to the extruder or mix the hemp feedstocks with a binder or other ingredients to create a blended feedstock that is subsequently transferred to the extruder of the upstream extrusion arrangement 110. In some preferred embodiments, the hemp biomass may not be segregated in the aforementioned separation arrangement 105. Instead, the hemp stalk will be shredded and screened to a preferred size based on the required performance of the final board in its intended application. Blending/mixing of these unseparated hemp feedstock may occur at various points within the separation arrangement 105 or just prior to the addition of the hemp feedstocks to the extruder of the upstream extrusion arrangement 110. In some preferred embodiments, a blending/mixing machine may be used to recombine hemp feedstocks. This may be of particular importance when combining hemp feedstocks derived from multiple hemp sources or from different hemp plant genetics. For example, different genetic strains of hemp may have different percentages of hurd and bast fiber and lignin as well as varied structural characteristics. Similar genetic strains can have different percentages of hurd and bast fiber depending on the growing conditions, location, water qualities, and available nutrients, etc. The objectives of mixing/blending include, but are not limited to, more consistent combination of bast fiber and hurd, increased processing efficiencies, more uniform distribution of feedstock(s) with the binder prior to undergoing extrusion, and more consistent physical properties of a finished EHB product 300 due to increased dispersive and distributed mixing.

As previously mentioned, the finished EHB product 300 may comprise a combination of hemp feedstocks and binder material 107C to obtain the desired physical characteristics. For example, the hemp feedstock may comprise a combination of hemp hurd 107B and hemp bast fiber 107A, which when combined with the desired binder material 107C may create a finished EHB product 300 having specific physical characteristics that differ than the physical characteristics of a finished EHB product 300 using the same binder material 107C but with the inclusion of only hemp hurd 107B or hemp bast fiber 107A. In one preferred embodiment, the extrudate used to create the optimal finished EHB product 300 comprises a single hemp feedstock having a single desired length and/or diameter. In this example, hemp bast fiber 107A acting as the lone hemp feedstock may be combined with a desired binder material 107C to create a finished EHB product 300 having specific physical characteristics to meet a unique market requirement. The hemp bast fiber 107A having a maximum length of 15 millimeters may yield optimal results when combined with a specific binder. Alternatively, hemp bast fiber 107A with a maximum length of 0.5 millimeters may yield similar results for the same market requirement but with different binder. In another preferred embodiment, the extrudate used to create an ideal finished EHB product 300 may require hemp feedstocks with one or more desired lengths and/or diameters having to combine with a specific binder to create the optimal finished EHB product 300. Therefore, the physical characteristics of the finished EHB product 300 may be highly dependent on which hemp feedstock(s) is combined with a specific binder material 107C but also how the size of the hemp feedstock(s) interacts with the binder material 107C when encapsulated within said binder material 107C. These feedstocks may be stored separately and added to the mixing machine and/or extruder so that fine tuning of the finished EHB product 300 may be accomplished by simply changing the amount of each feedstock that is added to the mixing machine and/or extruder.

In some preferred embodiments, the hemp feedstocks (separated, non-separated, recombined, etc.), may be pre-compounded or partially pre-compounded with a binder material 107C a pelletized to create feedstock pellets, which may then be added to the upstream extrusion arrangement 110. Pelletized feedstocks are mixed and compounded in a way that further increases homogeneity of the extrudate due to the mixing that occurs prior to the feedstocks being pelletized. Secondary feedstocks may be added to the upstream extrusion arrangement 110 to create custom EHB products with similar hemp feedstock and binder material 107C compositions. In some embodiments, the feedstock pellets may further comprise secondary feedstocks, reducing the amount of work that must be done to manage the ratio of feedstocks/secondary feedstocks added to the upstream extrusion arrangement 110. The resulting finished EHB products 300 may have fewer defects as a result. Secondary feedstocks that may be pre-compounded or partially pre-compounded with the hemp feedstock and binder material 107C include, but are not limited to, color pigments, UV inhibitors, carbon black, flame retardants, metal nanoparticles, or any combination thereof. Equipment that may be used to create pelletized feedstocks include, but are not limited to, single screw extruders, twin-screw extruders, "Banbury" type mixers, or any combination thereof. Though single screw, twin, screw, and "Banbury" type mixers are discussed as the means for creating the pelletized feedstocks, one skilled in the art will understand that other equipment and methods may be used to pre-compound the feedstocks without departing from the inventive subject matter described herein.

In a preferred embodiment, hemp hurd 107B used to create the finished EHB product 300 comprises a particle size of 0.002-8 millimeters, and the hemp bast fiber 107A used to create the finished EHB product 300 comprises a diameter range of 0.002-0.200 millimeters and a length range of 0.002-36 millimeters. However, one with skill in the art will understand that hemp hurd 107B and hemp bast fiber 107A having other diameters and/or lengths may be used without departing from the inventive subject matter described herein. Further, one with skill in the art will understand that the screening or micronization process used to create the hemp feedstocks can produce a "broad range" of outputs ranging from a "sub-micron" size to larger particles that exceed 8 millimeters. The benefit of using hemp feedstocks with a broad range of lengths and diameters is that it allows for greater loading of the hemp feedstocks and any secondary feedstocks, which may produce a superior finished EHB product 300. A cross sectional view of the finished EHB product 300 under a microscope will show the variable length and width of the feedstocks are highly dispersed throughout, resulting in a more consistent matrix between the binder material 107C and the feedstocks. This consistency contributes to the overall strength of the product by eliminating weak points in the board by allowing for more consistent binding throughout. Also, this consistency allows for better encapsulation of the raw materials and improves the "compressive strength" of the final product. Additionally, finished EHB products 300 created using hemp feedstocks with a broad range of lengths and diameters have enhanced UV resistance by eliminating UV light permeation into the hemp-binder matrix due to broad range of lengths and diameters dispersed through the finished EHB product 300 that prevent light permeation.

As previously mentioned, the physical properties of the finished EHB product 300 may be fine-tuned based on the different percentages of hemp feedstock and binder material 107C used to create the extrudate. A higher percentage of hemp feedstock relative to the binder material 107C will increase tensile stress, tensile strength, impact strength, and flexural modulus in the finished EHB product 300. For example, because the reactive hydroxyl groups of hemp bast fibers 107A offer effective interaction between the hemp feedstocks and a polar binder material 107C, a finished EHB product 300 having a higher percentage of hemp feedstock can absorb energy from an impact better than a finished EHB product 300 with a lower percentage of hemp feedstock. As such, a finished EHB product 300 having a higher percentage of hemp bast fiber 107A may be superior for roof boards that contain increased bast fiber content to increase board stiffness. Because the encapsulation of the hemp bast fiber 107A by the binder material 107C in all EHB versions creates a much more water-resistant material, a finished EHB product 300 comprising a higher percentage of hemp bast fiber 107A will be particularly useful in roof boards in regions that are prone to experience hailstorms, heavy rainfall, or high humidity.

FIGS. 9 and 10 illustrate some of the ways in which hemp hurd 107B and hemp bast fiber 107A may be used in various percentages with a binder to maximize/minimize different physical properties and/or mechanical properties of the finished EHB product 300. In particular, a higher percentage of hemp bast fiber 107A and/or hemp hurd 107B relative to a binder percentage in a finished EHB product 300 can increase edge strength, flexural modulus, tensile/pull strength, and screw pull strength (fastener retention). Conversely, a decrease in hemp feedstocks and an increase in a binder may increase the ductile impact strength. An increase in edge strength is particularly beneficial for construction boards since boards that have higher edge strengths will experience less cracking during transport and installation and be more durable in their application. In a preferred embodiment, the combination of hemp hurd 107B and hemp bast fiber 107A loading can be kept between 15% and 85% by volume to reduce discontinuity, non-homogeneity, and agglomeration of the hemp feedstocks during the extrusion process. However, as little as 5% by volume and as much as 95% by volume of hemp bast fiber 107A and/or hemp hurd 107B in combination with a binder may be used without departing from the inventive subject matter described herein.

The amount of hemp feedstock as a percentage of the extrudate depends on the targeted end use application of the final EHB product. The desired material and board performance are achieved based on the increase or decrease in all the various feedstock combinations plus the impact of the board thickness. The percentage of hemp feedstock in relation to the binder material 107C may be increased or decreased, depending on the binder material 107C used, to create a finished EHB product 300 with a higher fastener retention, therefore increasing rigidity at the screw flight and the fastener grip points. For example, boards comprising a softer binder could have a higher fastener retention despite an increased hemp hurd 107B content and lower bast fiber content, assuming highly effective dispersion and a broad array of hurd sizes are used (for instance, ranging from 5 micron to 16 mm). Further, fastener retention increases as the amount of hemp feedstock increases, the board thickness increases, and the bast fiber length increases (to a point of diminishing returns). For example, a thicker board may utilize a blend of feedstocks that has an increased amount of hurd in a smaller micron range and decreased bast fiber content in a longer bast fiber range. This specific combination increases screw retention similar to a thinner board that contains a decreased hurd content but a higher bast fiber and binder content to achieve a balance of impact resistance, fastener retention, and flexural modulus. One skilled in the art will understand that these varied material matrices do not depart from the inventive subject matter contained herein. As such, an EHB product can be optimized for situations where it may be required to hold a plurality of fasteners under variable stresses. For example, a finished EHB product 300 optimized for use as framing for furniture construction may require a higher fastener retention due to the number of screws and/or nails used to produce the final furniture product and may require a certain amount of binder to reduce the cracking that can occur when fasteners such as screws and nails are used.

Further, in embodiments where a finished EHB product 300 is to be used in a setting where board weight is a major factor, a higher percentage of hemp feedstock may be better used due to the specific gravity being lower than that of the binder. This may result in a finished EHB product 300 with a lower density in addition to a higher fastener retention based on the type of fastener. In embodiments where a lower density board may be desired due to an installation where weight is an issue, the combination of final thickness, increased hemp feedstocks, and an appropriate amount of binder can create a lighter weight board with a high degree of strength while also preventing sagging. Further, lighter weight boards should decrease the physical burden on the installer. For example, a finished EHB product 300 optimized for the finishing of an interior ceiling may require a higher fastener retention and be lighter in weight to make it less physically burdensome for the installer. In this example it may be beneficial for such a finished EHB product 300 to integrate a blowing/foaming agent during the extrusion process to increase the insulative and sound deadening properties plus decreasing its weight while maintaining high fastener retention.

For certain applications, a finished EHB product 300 may require a high degree of water resistance. This can be achieved by increasing the percentage of binder used to encapsulate the hemp feedstocks. For example, a finished EHB product 300 optimized for structural sheathing may require a higher moisture resistance and therefore may have a higher percentage of binder than hemp feedstock. Further, a finished EHB product 300 having at least 15% by volume of hemp feedstock will allow a clean pass through of a fastener without the board cracking. This might be particularly important for high volume installations when a high-pressure pneumatic nail gun is used. A higher binder content will also increase the thermal/hydraulic stability of the finished EHB product 300. Traditional board applications where there is a high likelihood of thermal/hydraulic expansion require a gap between the installed boards to accommodate this expansion and contraction and to avoid heaving of the boards when installed. This gap between boards is often mandated for decking under roofs. A finished EHB product 300 optimized for roofs will not require any gap during installation. The finished EHB product 300 will be thermally and hydraulically stable due to the highly dispersed and encapsulated non-binder feedstocks, which will prevent any thermal/hydraulic expansion and contraction from occurring. A finished EHB product 300 optimized for roofs preferably comprises a blend of hemp feedstocks and binder material 107C that balances the impact resistance, edge strength, and fastener retention properties with the water resistance properties gained by having a higher percentage of nonpolar binder material 107C.

In a preferred embodiment, a finished EHB product 300 preferably comprises at least 30% binder material 107C. In comparison, typical oriented strand board (OSB) contains only 5% to 10% binder resulting in a much lower encapsulation of the wood particles. The limited encapsulation of the wood particles in OSB has created significant degradation problems throughout buildings where exposure to moisture is an issue. Processed hemp feedstocks because of their smaller particle size allow for more thorough encapsulation of the raw material by the binder. This encapsulation of the nonbinder materials 107C eliminates the potential of the finished EHB product 300 wicking moisture. The same board degradation due to moisture penetration is also applicable to plywood and drywall. The hygroscopic properties of a finished EHB product 300 are de minimis when compared to those of wood-based boards like plywood and OSB and gypsum-based drywall. The inherent moisture resistance will result in increased performance and durability over the lifetime of the finished EHB product 300 when compared to the durability of traditional wood-based boards and gypsum-based drywall. In embodiments of a finished EHB product 300 comprising a hemp feedstock having a maximum particle size of 150-200 microns and at least 30% nonpolar binder material 107C, where effective dispersion of the feedstocks has been achieved through shear forces created in the extrusion process, water molecules should be unable to penetrate more than 150-200 microns into the finished EHB product 300 due to the repulsion of said water molecules by the encapsulated nonpolar binder material 107C. However, even in embodiments of a finished EHB product 300 comprising a hemp feedstock having a maximum particle size of 150-200 microns and at least 30% nonpolar binder material 107C and where encapsulation is less than perfect, water penetration into the boards should be no greater than 1000 microns due to the unlikely scenario in which multiple particles/fibers of hemp feedstock would be aligned without any non-polar binder material 107C situated in between. As such, a finished EHB product 300 that comprises a nonpolar binder and wherein the extrudate from which it is formed underwent adequate distributive and dispersive mixing within the upstream extrusion arrangement 110 should be highly water resistant.

In a preferred embodiment, the binder material 107C may be a virgin binder material 107C, post-consumer/industrial waste binder material 107C, or a combination of the two. Types of materials that may act as the binder material 107C include, but are not limited to, starch-based binders, polymers, polyester resin, epoxy resin, polyurethane resin, ISO resin, vinyl ester resin, and methyl ethyl ketone peroxide (MEKP). In a preferred embodiment, the binder material 107C is at least one of a thermoplastic/thermoset, epoxy binder, and non-polymer, non-epoxy binder, or any combination thereof. For example, a thermoplastic may be combined with a low temperature epoxy (LTE) to create a binder material 107C that may be both curable and/or polymerizable, depending on the desired finished EHB product 300. In some preferred embodiments, the epoxy may be a heat-cured epoxy, which may be combined with a thermoplastic having a melt temperature similar in range to the curing temperature of the epoxy.

The hemp bast fiber 107A and hemp hurd 107B are preferably combined with a polymer binder to create the extrudate. The polymer binder is preferably that of the thermoplastic resin material possessing the ability to encapsulate the hemp feedstocks that reduce water absorption of the finished EHB products 300. In a preferred embodiment, thermoplastics used as a feedstock to create the finished EHB products 300 include, but are not limited to polyethylene (PE), polypropylene (PP), polyethylene terephthalate (PET or PETE), polyamide (Nylon/PA), acrylonitrile butadiene styrene (ABS), acrylonitrile styrene acrylate (ASA), cellulose acetate (CA), polybutylene terephthalate (PBT), polycarbonates (PC), polymethyl methacrylate (PMMA), polyvinyl chloride (PVC), polyphenylene oxide (PPO), polystyrene (PS), styrene acrylonitrile (SAN), thermoplastic elastomer (TPE), thermoplastic urethane (TPU), or any combination thereof.

As previously mentioned, some embodiments of a finished EHB product 300 may further comprise secondary feedstocks and/or chemical treatment of the hemp feedstocks. Secondary feedstocks may be added to the hemp feedstocks and binder material 107C to optimize a finished EHB product 300 so that it has physical/mechanical properties designed for a specific purpose. Types of secondary feedstocks that may be used to optimize a finished EHB product 300 include, but are not limited to, bio-derived carbon, gypsum, glass fiber, wood fines, blowing agents, additive flame retardants, anti-static agents, antimicrobial agents, coupling agents, or any combination thereof. Blowing agents may be defined as an additive used to produce a cellular structure within the finished EHB product 300 by causing a foaming process within the extrudate before or after it is ejected from the extruder. The cellular structure resulting from the use of this secondary feedstock decreases density and increases the insulative properties of the finished EHB product 300. Further, because the amount of feedstock used to create each cubic foot of finished EHB product 300 is reduced due to the resulting cellular structure, the cost to produce a blown, finished EHB product 300 is also reduced. As such, a blown, finished EHB product 300 may be useful in applications such as a gypsum-based wallboard replacement. Compounds that may act as the blowing agent include, but are not limited to, amines, amides, urea, urea-formaldehyde resins, dicyandiamide, melamine, polyamides, or any combination thereof.

Additive flame retardants may be defined as secondary feedstocks designed to inhibit/prevent the ignition of the binder material 107C and/or hemp feedstocks of the finished EHB product 300. In a preferred embodiment, flame retardants suppress the ignition of the binder material 107C and/or hemp feedstocks by creating a layer of charring on the outer surface of the finished EHB product 300 when said finished EHB product 300 is exposed to heat and/or a flame. Preferably the additive flame retardant comprises an acid source, charring agent, and blowing agent. Compounds that may act as the acid source include, but are not limited to, ammonium salts phosphates, polyphosphates, sulfates, and halides. Compounds that may act as the charring agent may include, but are not limited to, polyhydric compounds, starch, dextrin, sorbitol pentaerythritol (monomer, dimer, trimer), phenol-formaldehyde resins, and methylol melamine, or any combination thereof. In other embodiments, red phosphorous may be added to the hemp feedstocks and binder material 107C at a concentration between 2-10% by weight. This may be particularly useful for a finished EHB product 300 comprised of a thermoplastic binder material 107C such as polyamides, polyesters, polycarbonates, and ethyl-vinyl acetate or thermoset binder materials 107C such as polyurethanes, epoxies, melamine formaldehyde, and polyisocyanates since it can catalyze char creation with said thermoplastic binder materials 107C and thermoset binder materials 107C as well as the hemp feedstocks to help prevent further combustion. Furthermore, the high thermal stability of red phosphorous (up to 240 degrees Celsius) allows for it to survive the extrusion process without decomposing.

Anti-static agents may be defined as secondary feedstocks designed to reduce the static retention of the finished EHB product 300. Because hemp feedstocks can themselves act as antistatic agents, a finished EHB product 300 will not usually require the addition of an antistatic agent. However, in embodiments of a finished EHB product 300 that comprises a very high percentage of binder material 107C, an antistatic agent may be used. In a preferred embodiment, carbon may be used as the antistatic agent. Types of carbon that may be used as an antistatic agent include but are not limited to a bio-based carbon, graphene, carbon nanotubes, carbon fibers, carbon black, graphite, or any combination thereof.

UV stabilization agents may be defined as secondary feedstocks that combat the deterioration of the binder material 107C and significantly extend the life span of the finished EHB product 300 by inhibiting the photo oxidation process. UV stabilization agents may be effective at only 0.1-0.5% by weight relative to the weight of the binder material 107C and can be added during the extrusion process. In a preferred embodiment, types of secondary feedstocks that may be used as the UV stabilization agent include, but are not limited to, UV absorbers, quenchers, hindered amine light stabilizers, or any combination thereof. Further, finished EHB products 300 possess natural UV resistance due to the hemp feedstocks dispersed throughout, which increases as the percentage of hemp feedstock increases in the extrudate. This UV resistance in combination with the water resistance, resulting from the encapsulation of said hemp feedstocks in a hydrophobic binder material 107C, will create a natural barrier to UV degradation and water resistance for years of service life beyond that of traditional construction materials. In some embodiments, the incorporation of metal nanoparticles or other compounds/elements, such as chromated copper arsenate and zinc, may be used to provide resistance to fungal growth and pests.

Antimicrobial agents may be defined as secondary feedstocks designed to prevent the growth of bacteria, microbes, and other organic growth that may reduce the effective lifetime of the finished EHB product 300. In a preferred embodiment, an antimicrobial additive is applied to the finished EHB product 300 after extrusion. However, some embodiments of the finished EHB product 300 may comprise antimicrobial additives that are added during the extrusion process. In a preferred embodiment, metal nanoparticles may be used as a secondary feedstock that act as an antimicrobial agent and may be added to the hemp feedstock and binder material 107C during the extrusion process. As such, finished EHB products 300 do not experience the same accelerated degradation that occurs in traditional construction materials. Finished EHB products 300 optimized for fencing, decking, and roof boards especially exhibit a longer service life than traditional construction materials. Because the fasteners used to secure the decking/fencing to a framework create holes that form intrusion points for water and pests, and which increase in size as the boards experience freeze and thaw cycles in cold and temperate climates, the inherent water and pest resistance properties of finished EHB products 300 comprising nonpolar binder materials 107C inherently increase the service life in exterior applications. Metal nanoparticles that may act as an antimicrobial added during the extrusion process include, but are not limited to, Silver (Ag), gold (Au), titanium oxide (TiO2), copper oxide (CuO), zinc oxide (ZnO), magnesium oxide (MgO), or any combination thereof.

Colorants may be added during the extrusion process to assist with the identification of a finished EHB product 300, reduce the number of labor steps during construction, increase thermal stability, etc. For example, by adding a colorant to the finished EHB product 300 to impart a neutral color, it may reduce the amount of time required to paint since the color may eliminate the need for a primer coating. In some instances, the addition of a colorant to the finished EHB product 300 may obviate the need to paint all together. For example, the addition of titanium dioxide to the finished EHB product 300 optimized for wallboard may impart a white color on the finished EHB product 300, resulting in wallboard that does not need painting after installation except to hide seems and fasteners. Further, some colorants may provide multiple benefits. For instance, the addition of carbon black may color the finished EHB product 300 black as well as increase thermal stability and impart antistatic properties. The addition of bio-carbon may even allow the finished EHB product 300 to act as a carbon sink in addition to its colorant value.

Secondary feedstocks in the form of materials obtained from various waste streams may also be used as secondary feedstocks. By including materials from industrial/residential waste streams, a finished EHB product 300 may have a reduced cost and a positive environmental impact. In a preferred embodiment, materials obtained from waste streams and used as secondary feedstocks include, but are not limited to, wood fines, bio-carbon, gypsum, glass fibers, post-consumer/industrial plastics, or any combination thereof. The use of post-consumer/industrial plastic may be particularly useful for a finished EHB product 300 optimized for applications in which slight reductions in physical and mechanical properties due to the degradation of the polymeric material are acceptable. For example, a finished EHB product 300 that has been foamed and optimized for use as wallboard may be created using 20% by volume hemp feedstock, 10% by volume wood fines, 10% by volume recycled gypsum, 5% by volume recycled glass fibers, 5% by volume bio-carbon, and 50% by volume post-consumer plastic. The resulting foamed, finished EHB product 300 will be as durable as gypsum board but with improved acoustical, insulative, and hygroscopic properties. Additionally, the environmental benefits of the said foamed, finished EHB product 300 are environmentally superior to that of gypsum board due to the waste usage and carbon capture advantages of the hemp plant. For example, finished EHB products 300 optimized for decking board and/or fencing board applications are preferably made from hemp bast fiber 107A and hemp hurd 107B plus post-consumer/post-industrial recycled thermoplastics and thermoplastics, or a blend of other highly loaded recycled materials plus small amounts of virgin material to increase flow rates.

Chemical treatments that may be used to treat the hemp feedstocks to change structural features of the hemp feedstocks include, but not limited to, NaOH, polyethyleneimine, $Na_2SO_4$, and $Ca(OH)_2$. Chemically altering structural features of the hemp feedstocks may modify certain properties, such as hydrophilicity, and improve the flame-retardant properties of the resulting hemp-based composite. For example, the addition of phosphorous to the hemp enhances the limiting oxygen index (LOI) of hemp-based composites, resulting in a decreased rate of heat release and increase in its resistance to combustion. Additional treatment with phosphines can enhance flame retardancy as well. Treatment of hemp feedstocks with water-soluble sulfonic acid derivatives can reduce surface polarity (lowering water solubility) of the hemp feedstocks in addition to improving thermal stability, resulting in a stronger hemp-polymeric matrix and higher flame resistance.

Additionally, depending on the type of binder material 107C used, weak bonding between the hydrophilic hemp feedstocks and a hydrophobic binder materials 107C may result in a weaker hemp-binder matrix. Therefore, in some embodiments, hemp feedstocks may need chemical treatment to enhance bonding in any resulting fiber-binder matrix interface of the composite material. Chemical treatment of the hemp feedstocks may be particularly useful when said chemical treatments additionally reduce hydrophilicity of said feedstocks. When chemical treatment to reduce hydrophilicity and increase bonding between the feedstock and binder material 107C is combined with the use of a nonpolar binder material 107C (such as polyethylene (PE), polypropylene (PP), and polystyrene (PS)), the resulting finished EHB product 300 may be particularly water resistant. As such, some preferred embodiments of the finished EHB product 300 contain at least 30% of a nonpolar binder material 107C and no more than 70% hemp feedstock. At least part of said hemp feedstock has been chemically treated to increase binding between it and the nonpolar binder material 107C as well as to reduce the hydrophilicity of the hemp feedstock. Chemical treatments that may be used to increase bonding between the hemp feedstocks include, but are not limited to, maleic anhydride and stearic acid.

Tables 1-12 illustrate various compositions and board thicknesses of finished EHB products 300 optimized for use as floor board, roof board, exterior walls, and interior walls. Tables 1-12 further illustrate the physical performance of said finished EHB products 300 in areas such as moisture resistance, thermal/hydraulic stability, edge strength, stiffness, impact strength, and sound deadening when compared to that of traditional construction materials such as OSB, plywood, wood paneling, plaster, and drywall. The traditional boards and the various finished EHB products 300 are graded in those areas from a scale of 1 to 5, wherein 1 indicates a poor performance and a 5 indicates an excellent performance. Tables 1-3 illustrate embodiments of finished EHB products 300 optimized for use as floor board with board thicknesses ranging from 19/32" to 1⅛". Tables 4-6 illustrate embodiments of finished EHB products 300 optimized for use as roof board with board thicknesses ranging from 7/16" to ¾". Tables 7 and 8 illustrate embodiments of finished EHB products 300 optimized for use as exterior walls with board thicknesses ranging from ¼" to ⅝". Tables 9 and 10 illustrate embodiments of finished EHB products 300 optimized for use as interior walls with board thicknesses ranging from ¼" to ⅝". Tables 11 and 12 illustrate embodiments of EHB optimized for use as decking and fencing with dimensions ranging from 1"×4" to 2"×8".

Further, Tables 1-12 indicate that the various finished EHB product 300 combinations have superior physical properties when compared to traditional construction boards like OSB, plywood, drywall, and treated lumber in every building application. For example, as illustrated in Table 1, a finished EHB product 300 optimized for use as a low-profile subfloor under carpet may comprise approximately 30% by volume hemp feedstock and 70% by volume nonpolar, virgin polymer binder. The resulting finished EHB product 300 (FB1) possesses superior moisture resistance, thermal/hydraulic stability, edge strength, stiffness, impact strength, and sound deadening properties when compared to that of OSB or plywood. In fact, neither OSB nor plywood can match the performance of FB1-FB18 except for having comparable stiffness to FB6. Furthermore, as the board thickness increases, a higher percentage of hemp feedstock may be used with a lower percentage of binder material 107C to achieve the same superior physical properties when compared to that of OSB and plywood. This may reduce the cost of finished EHB products 300 optimized for flooring as well as impart more wood like qualities.

One skilled in the art will understand that physical characteristics of the finished EHB product 300 may change based on several factors, including the type of extrusion process used, board thickness of the finished EHB product 300, how secondary feedstocks interact with the hemp-binder matrix, whether the feedstocks are virgin or recycled materials, percentages of feedstocks used, structural characteristics of the feedstocks (such as length and diameter), etc. Tables 1-12 contain several embodiments of finished EHB products 300 and are representative of the noted characteristics of these positive combinations. The assigned performance levels of the finished EHB products 300 contained in Tables 1-12 are based on the comparative performance to the "industry" standard and the manufacturing process utilized for the industry standard. Due to the process of manufacture of traditional construction materials, finished EHB products 300 inherently possess superior physical characteristics in comparison.

TABLE 1

Embodiments of finished EHB products optimized for floor board and their properties, wherein said embodiments comprise a board thickness of 19/32" and ⅝."

| Attribute | OSB | Floor Board #1 | Floor Board #2 | Floor Board #3 | Floor Board #4 | Floor Board #5 | Floor Board #6 |
|---|---|---|---|---|---|---|---|
| Board Thickness (in.) | 19/32", ⅝" | 19/32", ⅝" | 19/32", ⅝" | 19/32", ⅝" | 19/32", ⅝" | 19/32", ⅝" | 19/32", ⅝" |
| Binder material (% by volume) | ~5% to ~10% | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 1 | 3 | 4 | 4 | 4 | 5 | 5 |
| Thermal & Hydraulic Stability | 1 | 3 | 4 | 4 | 4 | 5 | 5 |
| Edge Strength | 2 | 3 | 3 | 4 | 5 | 5 | 4 |

TABLE 1-continued

Embodiments of finished EHB products optimized for floor board and their properties, wherein said embodiments comprise a board thickness of 19/32" and 5/8."

| Attribute | OSB | Floor Board #1 | Floor Board #2 | Floor Board #3 | Floor Board #4 | Floor Board #5 | Floor Board #6 |
|---|---|---|---|---|---|---|---|
| Stiffness | 3 | 4 | 5 | 5 | 4 | 4 | 3 |
| Impact Strength | 2 | 3 | 3 | 4 | 4 | 5 | 5 |
| Sound Deadening | 1 | 3 | 3 | 4 | 4 | 5 | 5 |

TABLE 2

Embodiments of finished EHB products optimized for floor board and their properties, wherein said embodiments comprise a board thickness of 23/32", 3/4", and 7/8".

| Attribute | OSB | Floor Board #7 | Floor Board #8 | Floor Board #9 | Floor Board #10 | Floor Board #11 | Floor Board #12 |
|---|---|---|---|---|---|---|---|
| Board Thickness (in.) | 23/32", 3/4", 7/8" | 23/32", 3/4", 7/8" | 23/32", 3/4", 7/8" | 23/32", 3/4", 7/8" | 23/32", 3/4", 7/8" | 23/32", 3/4", 7/8" | 23/32", 3/4", 7/8" |
| Binder material (% by volume) | ~5% to ~10% | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 1 | 3 | 4 | 5 | 5 | 5 | 5 |
| Thermal & Hydraulic Stability | 1 | 3 | 4 | 5 | 5 | 5 | 5 |
| Edge Strength | 2 | 3 | 3 | 5 | 5 | 5 | 4 |
| Stiffness | 3 | 5 | 5 | 5 | 4 | 4 | 4 |
| Impact Strength | 2 | 3 | 3 | 4 | 5 | 5 | 5 |
| Sound Deadening | 1 | 3 | 4 | 4 | 5 | 5 | 5 |

TABLE 3

Embodiments of finished EHB products optimized for floor board and their properties, wherein said embodiments comprise a board thickness of 1" and 1 1/8".

| Attribute | OSB | Floor Board #13 | Floor Board #14 | Floor Board #15 | Floor Board #16 | Floor Board #17 | Floor Board #18 |
|---|---|---|---|---|---|---|---|
| Board Thickness (in.) | 1", 1 1/8" | 1", 1 1/8" | 1", 1 1/8" | 1", 1 1/8" | 1", 1 1/8" | 1", 1 1/8" | 1", 1 1/8" |
| Binder material (% by volume) | ~5% to ~10% | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 1 | 3 | 4 | 5 | 5 | 5 | 5 |
| Thermal & Hydraulic Stability | 1 | 3 | 4 | 5 | 5 | 5 | 5 |
| Edge Strength | 2 | 3 | 4 | 5 | 5 | 5 | 4 |

TABLE 3-continued

Embodiments of finished EHB products optimized for floor board and their properties, wherein said embodiments comprise a board thickness of 1" and 1⅛".

| Attribute | OSB | Floor Board #13 | Floor Board #14 | Floor Board #15 | Floor Board #16 | Floor Board #17 | Floor Board #18 |
|---|---|---|---|---|---|---|---|
| Stiffness | 3 | 5 | 5 | 5 | 5 | 4 | 4 |
| Impact Strength | 2 | 4 | 4 | 4 | 5 | 5 | 5 |
| Sound Deadening | 1 | 3 | 4 | 5 | 5 | 5 | 5 |

A finished EHB product 300 optimized for roofs is also almost always superior to the equivalent OSB or plywood roof board products. For example, as illustrated in Table 5, a finished EHB product 300 optimized for use as low-profile roof board may comprise approximately 70% by volume hemp feedstock and 30% by volume non-polar, virgin polymer binder. The resulting finished EHB product 300 (RB7) possesses superior moisture resistance, thermal/hydraulic stability, edge strength, stiffness, impact strength, and sound deadening properties when compared to that of OSB and plywood. As the board thickness of roof board increases, the finished EHB products 300 embodied in Tables 3-6 continue to possess superior physical properties when compared to that of OSB or plywood having a similar thickness. For roof board having a thickness of greater than 23/32", the composition of the finished EHB product 300 is preferably between 50% to 95% by volume binder material 107C, depending on the conditions in which the finished EHB product 300 will be exposed. In cooler climates, a finished EHB product 300 having a higher percentage of hemp feedstock may be preferable due to the possible increased brittleness of the binder material 107C as temperature drops. A lower percentage of hemp feedstock may be preferable in warmer, tropical climates where higher humidity can cause rotting, molding, and fungal growth in traditional construction boards. Hemp feedstocks, preferably range from 15% to 70% by volume of the extrudate, depending on the target application and board thickness. By increasing the impact strength through either a reduction in the total hemp loading or by increasing the amount of the impact modifier, or both, an extruded board can be created that can handle cold temperature environments with greater impact resistance.

TABLE 4

Embodiments of finished EHB products optimized for roof board and their properties, wherein said embodiments comprise a board thickness of 23/32" and 3/4".

| Attribute | OSB | Roof Board #1 | Roof Board #2 | Roof Board #3 | Roof Board #4 | Roof Board #5 | Roof Board #6 |
|---|---|---|---|---|---|---|---|
| Board Thickness (in.) | 23/32", 3/4" | 23/32", 3/4" | 23/32", 3/4" | 23/32", 3/4" | 23/32", 3/4" | 23/32", 3/4" | 23/32", 3/4" |
| Binder material (% by volume) | ~5% to ~10% | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 1 | 4 | 4 | 5 | 5 | 5 | 5 |
| Thermal & Hydraulic Stability | 1 | 4 | 5 | 5 | 5 | 5 | 5 |
| Edge Strength | 2 | 5 | 5 | 5 | 5 | 5 | 5 |
| Stiffness | 4 | 5 | 5 | 5 | 5 | 4 | 4 |
| Impact Strength | 3 | 3 | 3 | 4 | 4 | 5 | 5 |
| Sound Deadening | 1 | 3 | 3 | 4 | 4 | 5 | 5 |

TABLE 5

Embodiments of finished EHB products optimized for roof board and their properties, wherein said embodiments comprise a board thickness of 1/2", 19/32", and 5/8".

| Attribute | OSB | Roof Board #7 | Roof Board #8 | Roof Board #9 | Roof Board #10 | Roof Board #11 | Roof Board #12 |
|---|---|---|---|---|---|---|---|
| Board Thickness (in.) | 1/2", 19/32", 5/8" | 1/2", 19/32", 5/8" | 1/2", 19/32", 5/8" | 1/2", 19/32", 5/8" | 1/2", 19/32", 5/8" | 1/2", 19/32", 5/8" | 1/2", 19/32", 5/8" |

TABLE 5-continued

Embodiments of finished EHB products optimized for roof board and their properties, wherein said embodiments comprise a board thickness of ½", ¹⁹⁄₃₂", and ⅝".

| Attribute | OSB | Roof Board #7 | Roof Board #8 | Roof Board #9 | Roof Board #10 | Roof Board #11 | Roof Board #12 |
|---|---|---|---|---|---|---|---|
| Binder material (% by volume) | ~5% to ~10% | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 1 | 4 | 5 | 5 | 5 | 5 | 5 |
| Thermal & Hydraulic Stability | 1 | 4 | 5 | 5 | 5 | 5 | 5 |
| Edge Strength | 2 | 4 | 4 | 5 | 5 | 4 | 4 |
| Stiffness | 3 | 5 | 5 | 5 | 4 | 4 | 3 |
| Impact Strength | 3 | 4 | 4 | 4 | 5 | 5 | 5 |
| Sound Deadening | 1 | 3 | 3 | 4 | 4 | 5 | 5 |

TABLE 6

Embodiments of finished EHB products optimized for roof board and their properties, wherein said embodiments comprise a board thickness of ⁷⁄₁₆" and ¹⁵⁄₃₂".

| Attribute | OSB | Roof Board #13 | Roof Board #14 | Roof Board #15 | Roof Board #16 | Roof Board #17 | Roof Board #18 |
|---|---|---|---|---|---|---|---|
| Board Thickness (in.) | ⁷⁄₁₆", ¹⁵⁄₃₂" | ⁷⁄₁₆", ¹⁵⁄₃₂" | ⁷⁄₁₆", ¹⁵⁄₃₂" | ⁷⁄₁₆", ¹⁵⁄₃₂" | ⁷⁄₁₆", ¹⁵⁄₃₂" | ⁷⁄₁₆", ¹⁵⁄₃₂" | ⁷⁄₁₆", ¹⁵⁄₃₂" |
| Binder material (% by) volume | ~5% to ~10% | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 1 | 4 | 4 | 5 | 5 | 5 | 5 |
| Thermal & Hydraulic Stability | 1 | 4 | 5 | 5 | 5 | 5 | 5 |
| Edge Strength | 2 | 3 | 4 | 5 | 5 | 4 | 4 |
| Stiffness | 3 | 5 | 5 | 4 | 4 | 4 | 3 |
| Impact Strength | 3 | 3 | 4 | 4 | 5 | 5 | 5 |
| Sound Deadening | 1 | 3 | 3 | 3 | 4 | 5 | 5 |

As illustrated in Tables 7-10, finished EHB products 300 are superior to OSB and plywood for exterior wall sheathing and gypsum-based drywall for interior walls and ceilings. For example, as illustrated in Table 7, a finished EHB product 300 optimized for use as exterior sheathing may comprise approximately 45% by volume hemp feedstock and 55% by volume non-polar, virgin polymer binder. The resulting finished EHB product 300 (EW3) possesses superior moisture resistance, thermal/hydraulic stability, edge strength, stiffness, impact strength, and sound deadening properties when compared to that of the traditional construction boards. As the board thickness increases, the physical properties of EHB compositions will only improve when compared to that of OSB, plywood and drywall. However, the superiority of EHB products is particularly pronounced when comparing low-profile finished EHB products 300 to low-profile drywall, as illustrated in Table 9. At no point do the physical properties of drywall come close to matching those of a finished EHB product 300 containing anywhere from 30% to 95% by volume binder material 107C.

TABLE 7

Embodiments of finished EHB products optimized for exterior walls and their properties, wherein said embodiments comprise a board thickness of ¼" and ⅜".

| Attribute | OSB | Exterior Walls #1 | Exterior Walls #2 | Exterior Walls #3 | Exterior Walls #4 | Exterior Walls #5 | Exterior Walls #6 |
|---|---|---|---|---|---|---|---|
| Board Thickness (in.) | ¼", ⅜" | ¼", ⅜" | ¼", ⅜" | ¼", ⅜" | ¼", ⅜" | ¼", ⅜" | ¼", ⅜" |
| Binder material (% by volume) | ~5% to ~10% | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 2 | 3 | 4 | 5 | 5 | 5 | 5 |
| Thermal & Hydraulic Stability | 2 | 3 | 4 | 5 | 5 | 5 | 5 |
| Edge Strength | 2 | 3 | 3 | 5 | 5 | 4 | 3 |
| Stiffness | 2 | 5 | 5 | 4 | 4 | 4 | 3 |
| Impact Strength | 2 | 3 | 3 | 4 | 4 | 5 | 5 |
| Sound Deadening | 1 | 2 | 3 | 3 | 4 | 5 | 5 |

TABLE 8

Embodiments of finished EHB products optimized for exterior walls and their properties, wherein said embodiments comprise a board thickness of ½" and ⅝".

| Attribute | OSB | Exterior Walls #7 | Exterior Walls #8 | Exterior Walls #9 | Exterior Walls #10 | Exterior Walls #11 | Exterior Walls #12 |
|---|---|---|---|---|---|---|---|
| Board Thickness (in.) | ½", ⅝" | ½", ⅝" | ½", ⅝" | ½", ⅝" | ½", ⅝" | ½", ⅝" | ½", ⅝" |
| Binder material (% by volume) | ~5% to ~10% | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 2 | 3 | 4 | 5 | 5 | 5 | 5 |
| Thermal & Hydraulic Stability | 2 | 3 | 4 | 5 | 5 | 5 | 5 |
| Edge Strength | 2 | 3 | 4 | 5 | 5 | 5 | 4 |
| Stiffness | 2 | 5 | 5 | 5 | 4 | 4 | 4 |
| Impact Strength | 2 | 3 | 4 | 4 | 5 | 5 | 5 |
| Sound Deadening | 1 | 3 | 4 | 4 | 4 | 5 | 5 |

TABLE 9

Embodiments of finished EHB products optimized for interior walls and their properties, wherein said embodiments comprise a board thickness of ¼" and ⅜".

| Attribute | Drywall | Interior Walls #1 | Interior Walls #2 | Interior Walls #3 | Interior Walls #4 | Interior Walls #5 | Interior Walls #6 |
|---|---|---|---|---|---|---|---|
| Board Thickness (in.) | ¼", ⅜" | ¼", ⅜" | ¼", ⅜" | ¼", ⅜" | ¼", ⅜" | ¼", ⅜" | ¼", ⅜" |

TABLE 9-continued

Embodiments of finished EHB products optimized for interior walls and their properties, wherein said embodiments comprise a board thickness of ¼" and ⅜".

| Attribute | Drywall | Interior Walls #1 | Interior Walls #2 | Interior Walls #3 | Interior Walls #4 | Interior Walls #5 | Interior Walls #6 |
|---|---|---|---|---|---|---|---|
| Binder material (% by volume) | ~5% to ~10% | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 1 | 4 | 5 | 5 | 5 | 5 | 5 |
| Thermal & Hydraulic Stability | 1 | 4 | 5 | 5 | 5 | 5 | 5 |
| Edge Strength | 1 | 4 | 4 | 5 | 5 | 4 | 4 |
| Stiffness | 1 | 5 | 5 | 4 | 4 | 4 | 4 |
| Impact Strength | 1 | 4 | 4 | 4 | 5 | 5 | 5 |
| Sound Deadening | 1 | 4 | 4 | 5 | 5 | 5 | 5 |

TABLE 10

Embodiments of finished EHB products optimized for interior walls and their properties, wherein said embodiments comprise a board thickness of ½" and ⅝".

| Attribute | Drywall | Interior Walls #7 | Interior Walls #8 | Interior Walls #9 | Interior Walls #10 | Interior Walls #11 | Interior Walls #12 |
|---|---|---|---|---|---|---|---|
| Board Thickness (in.) | ½", ⅝" | ½", ⅝" | ½", ⅝" | ½", ⅝" | ½", ⅝" | ½", ⅝" | ½", ⅝" |
| Binder material (% by volume) | ~5% to ~10% | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 1 | 4 | 5 | 5 | 5 | 5 | 5 |
| Thermal & Hydraulic Stability | 1 | 4 | 5 | 5 | 5 | 5 | 5 |
| Edge Strength | 2 | 4 | 4 | 5 | 5 | 5 | 5 |
| Stiffness | 3 | 5 | 5 | 5 | 5 | 4 | 4 |
| Impact Strength | 1 | 4 | 5 | 5 | 5 | 5 | 5 |
| Sound Deadening | 1 | 4 | 5 | 5 | 5 | 5 | 5 |

Further, as illustrated in Tables 11-12, finished EHB products 300 optimized for decking and/or fencing may be expected to perform better than wood boards due to a higher water/pest resistance. More consistent "grain," resulting from the dispersive mixing, disruptive mixing, and fiber/chain alignment, should also reduce the likelihood of warping that boards used for decking and fencing often experience. In one preferred embodiment, a finished EHB product 300 optimized for decking and/or fencing may be "scored" in way that creates a complete sheet of decking and/or fencing boards that may be installed simultaneously while providing the look of multiple separate boards, resulting in decreased installation times without a decrease in aesthetics. In some preferred embodiments, finished EHB products 300 optimized for fencing utilize interlocking edges that may be used to create true privacy fences having interconnected boards/panels. Interlocking edges may also be used with finished EHB products 300 optimized for decking to create a "solid deck" having minimal or no gapping between the boards. Finished EHB products 300 optimized for decking and/or fencing preferably comprise sizes commonly used for decking and/or fencing, including, but not limited to, 2"×4", 2"×6", 2"×8", 1"×4", 1"×6", and 1"×8".

TABLE 11

Embodiments of finished EHB products optimized for decking and fencing, wherein said embodiments comprise dimensions of 1" × 4", 1" × 6", and 1" × 8".

| Attribute | Common Treated Wood | Deck/Fence Board 1 | Deck/Fence Board 2 | Deck/Fence Board 3 | Deck/Fence Board 4 | Deck/Fence Board 5 | Deck/Fence Board 6 |
|---|---|---|---|---|---|---|---|
| Board Dimensions (in.) | 1" × 4", 1" × 6", 1" × 8" | 1" × 4", 1" × 6", 1" × 8" | 1" × 4", 1" × 6", 1" × 8" | 1" × 4", 1" × 6", 1" × 8" | 1" × 4", 1" × 6", 1" × 8" | 1" × 4", 1" × 6", 1" × 8" | 1" × 4", 1" × 6", 1" × 8" |
| Binder material (% by volume) | N/A | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 1 | 4 | 4 | 4 | 4 | 5 | 5 |
| Thermal & Hydraulic Stability | 1 | 4 | 4 | 4 | 4 | 5 | 5 |
| Edge Strength | 2 | 3 | 3 | 4 | 5 | 5 | 4 |
| Stiffness | 3 | 4 | 5 | 5 | 4 | 4 | 4 |
| Impact Strength | 1 | 4 | 5 | 5 | 5 | 5 | 5 |
| UV/Weather Resistance | 1 | 4 | 5 | 5 | 5 | 5 | 5 |

TABLE 12

Embodiments of finished EHB products optimized for decking and fencing, wherein said embodiments comprise dimensions of 2" × 4", 2" × 6", 2" × 8".

| Attribute | Common Treated Wood | Deck/Fence Board 7 | Deck/Fence Board 8 | Deck/Fence Board 9 | Deck/Fence Board 10 | Deck/Fence Board 11 | Deck/Fence Board 12 |
|---|---|---|---|---|---|---|---|
| Board Dimensions (in.) | 2" × 4", 2" × 6", 2" × 8" | 2" × 4", 2" × 6", 2" × 8" | 2" × 4", 2" × 6", 2" × 8" | 2" × 4", 2" × 6", 2" × 8" | 2" × 4", 2" × 6", 2" × 8" | 2" × 4", 2" × 6", 2" × 8" | 2" × 4", 2" × 6", 2" × 8" |
| Binder material (% by volume) | N/A | ~30% to ~40% | ~40% to ~50% | ~50% to ~60% | ~60% to ~70% | ~70% to ~85% | ~85% to ~95% |
| Hemp Feedstock (% by volume) | N/A | ~60% to ~70% | ~50% to ~60% | ~40% to ~50% | ~30% to ~40% | ~15% to ~30% | ~5% to ~15% |
| Moisture Resistance | 2 | 4 | 4 | 4 | 4 | 5 | 5 |
| Thermal & Hydraulic Stability | 1 | 4 | 4 | 5 | 4 | 5 | 5 |
| Edge Strength | 2 | 4 | 4 | 5 | 5 | 5 | 4 |
| Stiffness | 3 | 4 | 5 | 5 | 5 | 4 | 4 |
| Impact Strength | 3 | 4 | 5 | 5 | 5 | 5 | 5 |
| UV/Weather Resistance | 2 | 5 | 5 | 5 | 5 | 5 | 5 |

In addition, the finished EHB products 300 listed in Tables 1-12 may comprise one or more secondary feedstocks. In some instances, secondary feedstocks may improve the physical properties of the above embodiments. For example, by creating a finished EHB product 300 optimized for interior walls comprising 70% by volume binder material 107C, 25% by volume hemp feedstock, and 5% by volume red phosphorus, an IW8 board with enhanced flame-retardant properties will result. In another example, by combining a percentage of hemp feedstock with an equal percentage of glass fiber, a finished EHB product 300 possessing improved the moisture resistance, stiffness, and edge strength properties could be produced, which would be particularly useful as a roof board replacement. Further, a coupling agent may be added to each of the aforementioned embodiments to enhance bonding between the hemp feedstock and non-polar, virgin polymer binder. This could improve impact strength of the embodiments of Tables 1-12 significantly.

The upstream extrusion arrangement 110 generally comprises a hopper, dryer, extruder, and manifold. The feedstocks may be fed by the hopper into the extruder individually or as a blend of dry components. The dryer may be used to dry the feedstocks before being fed to the extruder, which will result in the creation of an extrudate with a more consistent moisture content. Alternatively, the feedstocks may be dried in another device/section of the system, allowing the hopper heater to simply maintain the moisture content within the dried feedstocks prior to injection into the extruder as well as to maintain a desirable feedstock temperature. The extruder is used to mix the feedstocks under high shear force to create the extrudate used to create the finished EHB product 300. In a preferred embodiment, the extruder generally comprises a motor, gear box operably connected to the motor, screw operably connected to the gear box, barrel, and manifold. The screw is configured to mix the feedstocks within the barrel. Feedstocks are injected into the barrel via a throat of the barrel, wherein the feedstocks are processed into an extrudate as it moves through said barrel due to action of the screw.

The extrudate is pushed through an opening of said barrel and into a manifold, which is configured to accept the extrudate from the barrel via an entry channel and distribute said extrudate across a width of a die outlet. The die outlet of the manifold molds the extrudate produced by the extruder into an extrudate sheet having a desired shape, wherein said desired shape may or may not require further processing via a choker bar, lower lip, flex-lip, and/or machinery of a downstream extrusion arrangement 115 to produce a finished EHB product 300. In a preferred embodiment, a slit manifold is used to create the extrudate sheet that is to be shaped into a finished EHB product 300, wherein said slit manifold may have symmetrical or asymmetrical die outlet. In a preferred embodiment, an asymmetrical die outlet is used to create features such as "tongue and groove," slots, depressions, linear scoring, ridges, waves, thicker or thinner sections, angles, profiles, etc. For example, the asymmetrical die outlet may be configured to mold an extrudate optimized for furniture construction into a finished EHB product 300 having the shape of furniture frame components, which can used to replace plywood or OSB, resulting in furniture that is more flexible and less expensive to produce and results in lower waste.

Additionally, a finished EHB product 300 may be optimized as ordered components that make up a structure and/or frame. Due to the die outlet and processing via the downstream extrusion arrangement 115, finished EHB products 300 in the form of ordered components may take on shapes that traditional construction materials may not easily accommodate, allowing for easy assembly of whatever the finished EHB products 300 in the form of ordered components is configured to make. In a preferred embodiment, ordered components may be used to produce framing for furniture, such as the framing of a sofa or loveseat. In another preferred embodiment, ordered components may be optimized to create entire building structures. A plurality of ordered components optimized for the creation of building structures are preferably configured to fit together in a very specific manner and may comprise finished EHB products 300 optimized for beams, exterior sheathing, wallboards, roof boards, flooring, floor underlayment, fencing, decking, and other construction boards required for construction of a building structure.

In a preferred embodiment, the building structure created by ordered components optimized for the creation of building structures is a shelter. As such, ordered components optimized for the creation of building structures may be extruded, molded, and processed to fit together in such a way that an emergency shelter could be constructed in a relatively quick timeframe when compared to emergency structures built using traditional construction materials. In less time-sensitive examples, ordered components optimized for the creation of building structures may be configured to fit together in a way such that they form commercial structures and/or residential structures. This would result in more affordable, durable, weather resistant, and environmentally friendly commercial and/or residential structures than what are currently available today. In yet another preferred embodiment, ordered components optimized for the creation of building structures may be configured to fit together in a way such that a modular building is formed. Modular buildings that may be created by ordered components optimized for the creation of building structures include, but are not limited to, modular homes, portable offices, mobile hospitals, and/or portable classrooms.

In a preferred embodiment, ordered components are provided in "kit form", wherein a EHB structure kit includes all of the components necessary for erecting a building structure. For instance, an EHB structure kit optimized for the creation of an emergency structure may comprise a plurality of finished EHB products 300 and fasteners that allow for the emergency structure to be quickly erected, utilized during the emergency, deconstructed, and returned to kit form. The EHB structure kit optimized for the creation of an emergency structure may then be erected in another location if necessary. For instance, after a hurricane, an emergency service provider having a plurality of EHB structure kits configured to provide emergency shelter could be quickly assembled so that victims of the natural disaster have protection from the elements. Once the emergency has passed, the EHB structure kits may be deconstructed and made ready for deployment during the next natural disaster. For instance, a mobile hospital servicing poor, rural areas may assemble EHB structure kits configured to provide mobile hospital facilities. After servicing the poor, rural community, the EHB structure kits may be deconstructed and made ready for deployment in the next poor, rural community. Because the EHB boards are highly water resistant, and as such more durable and less prone to potential mold and mildew complications, they are suitable for a wide multitude of environments.

Further, as illustrated in FIG. 15, shear force created during the extrusion process and acting on the extrudate will force the binder fibers/chains to align in the output direction of the extruder as it exits the die outlet of the manifold, resulting in a finished EHB product 300 that is anisotropic in behavior due to alignment of the binder material 107C and hemp feedstocks in a single direction. Though the hemp feedstocks encapsulated within the binder material 107C will also generally align in the output direction of the extruder, the highly varied structure of the hemp feedstocks will cause the composite material to have both the positive physical/mechanical properties of a material having highly-ordered binder fibers as well as the cross-bonding of layers due to the hemp-binder matrix, enhancing properties such as edge strength and pull strength. Blends of hemp feedstocks of varying sizes can impart the previously mentioned benefits that feedstocks having only minimal size ranges might not produce due to a wider variety of bonding. For example, where blends of the hemp bast fiber 107A and hemp hurd 107B contain variable lengths (potentially not discernible to the human eye, but as measured in microns), micronized hemp bast fiber 107A and micronized hemp hurd 107B will fill in voids (voids being defined as areas where there is significantly more binder material 107C than hemp feedstock as observed under a microscope) between larger hemp bast fibers 107A or hemp hurd 107B to create a hemp composite material with increased strength and fewer defective areas due to a more consistent hemp-binder matrix. Additionally, orientation of dispersed/distributed hemp bast fiber 107A and/or hemp hurd 107B of various lengths within the extruded composite will create product advantages when the machine direction versus transverse direction of the final product is considered since it will result in a final product with increased flexural modulus, increased tensile strength, and natural UV inhibition.

In some preferred embodiment, the die outlet may be configured to create patterns 1200 as the extrudate is ejected from the die outlet to form the extrudate sheet. For example, the die may be configured to output an extrudate sheet comprising a plurality of micronized grooves on at least one of the surfaces, wherein the microgrooves increase adhesion of a finishing coating or adhesive, such as laminates, paper, films, paint, tar, wax, glue, or any combination thereof. In other embodiments, a router may be used to create channels 405 within the extrudate sheet. Patterns 1200 that may be implemented into the extrudate sheet via the die include, but are not limited to, micronized grooves, popcorn, orange peel, knockdown, sand swirl, slap brush, comb, dimples, and channels 405.

For example, a finished EHB product 300 optimized for decking may comprise channels 405 that run the length of the board. By changing the overall surface area of the finished EHB product 300 with high, then low channels 405, a heat sink effect is produced, which increases the amount of heat dissipated by the board. Finished EHB optimized for decking and comprising channels 405 may also be configured to serve as a gutter to move water away from the home when said decking is properly installed. In some preferred embodiments, a finished EHB product 300 optimized for decking may comprise a pattern 1200 that includes a raised height with a dimpled surface that reduces contact with human feet and other body parts. Additionally, a dimpled surface, as illustrated in FIG. 12, will increase the overall surface area of the board, allowing the board to dissipate radiational heat more quickly, as well as potentially increase friction, reducing the likelihood of a person slipping when walking on said board.

The die may also be configured to produce an extrudate sheet comprising at least one molded shape 805. In one preferred embodiment, the at least one molded shape 805 is located on one or more edges of the extrudate sheet. For example, as illustrated in FIG. 11, an extrudate sheet optimized for wallboard may comprise an architectural molding on one edge and a flat surface on the other edge, wherein the architectural molding formed by the die as the extrudate is extruded to form the extrudate sheet. Molded shapes 805 that may be implemented into the extrudate sheet via the die include, but are not limited to, base architectural molding, crown architectural molding, ceiling molding, and corner architectural molding.

The thickness of a finished EHB product 300 is preferably determined by the manifold and the downstream extrusion arrangement 115. The board thickness of the finished EHB product 300 is preferably between $7/16$ of an inch and 1.5 inches; however, the manifold and downstream extrusion arrangement 115 may create other board thicknesses without departing from the inventive subject matter described herein. The thickness of the board may be specific to the application, wherein the feedstocks to make the finished EHB product 300 may also be specific for a particular application. For example, a finished EHB product 300 comprising 30% low temperature epoxy binder and 70% hemp feedstock and configured to be used as plywood replacement for roof underlayment may require a board thickness of $5/8"$. A finished EHB product 300 comprising 40% thermopolymer binder and 60% hemp feedstock and configured to be used for subflooring may require a board thickness of $23/32"$. In another example, a finished EHB product 300 comprising 50% natural binder and 50% hemp feedstock configured to be used for walls may require a board thickness of $7/16"$. In yet another example, a finished EHB product 300 comprising 60% thermoset binder and 40% hemp feedstock and configured to be used behind stucco walls may require a board thickness of only $1/2"$. The examples set forth are representations of blends that could perform in multiple applications or uses based on the final blend and desired thickness and may be modified to meet a certain requirement in performance based on a number of economic (performance versus cost), or other required attributes.

As illustrated in FIGS. 3 and 4, the finished EHB product 300 preferably comprises a top surface, bottom surface, and a plurality of sides. Once the extrudate sheet has been pushed through the die outlet, it may be further shaped and gradually cooled by the downstream extrusion arrangement 115. In a preferred embodiment, the downstream extrusion arrangement 115 comprises a plurality of rollers, heater/coolers, cutters, molders, sanders, painters, and stacker. Initial sizing past the manifold may be accomplished via the plurality of rollers that compress the extrudate sheet to the desired thickness and/or corrugate the extrudate sheet with a desired texture. In another preferred embodiment, a series of polishing rollers may be used to achieve a finished EHB product 300 that has a surface finish with low variability, which may allow for a more consistent application of a secondary finish or coating, such as paint and tar. In some embodiments, heated rollers may be used to keep the temperature of the extrudate sheet high enough such that the extrudate sheet remains pliable throughout much of the post extrusion process. This may allow for further sizing, compression, and compaction of the extrudate sheet until a desired finished EHB product 300 is produced. In some preferred embodiments, a plurality of water-cooled rollers or a cooling tank may be used to cool the extrudate sheet once it has been shaped and/or patterned. When the extrudate sheet has cooled beyond a "pliable or malleable state", further processing may be accomplished via planing, sanding, routing, cutting, or any combination thereof.

In one preferred embodiment, rollers and/or a post-curing processing methods may be used to form patterns 1200 on one or more surfaces of the extrudate sheet while it is still pliable. In some embodiments, patterns 1200 created by rollers and/or a post-curing processing methods may be implemented on the surfaces in addition to patterns 1200 created by the die. For example, the die may be configured to create an extrudate sheet having a knockdown pattern on one or more surfaces of the extrudate sheet whereas the rollers may be configured to add a plurality of micronized grooves to one or more surfaces of the extrudate sheet. Patterns 1200 that may be implemented into the extrudate sheet via the rollers and/or post-curing processing methods include, but are not limited to, micronized grooves, popcorn, orange peel, knockdown, sand swirl, slap brush, and comb.

Rollers and/or a post-curing processing methods of the downstream extrusion arrangement 115 may also be configured to produce an extrudate sheet comprising at least one molded shape 805. Molded shapes 805 may be formed by the rollers and/or post-curing processing methods either with the output direction of the die or perpendicular with the output direction of the die. For example, as illustrated in FIG. 11, an extrudate sheet may be shaped by the rollers into a single piece having a plurality of architectural molding shapes in a single piece and perpendicular to the output direction of the die. Molded shapes 805 that may be implemented into the extrudate sheet via the die include, but are not limited to, base architectural molding, crown architectural molding, ceiling molding, and corner architectural molding. Where the extrudate sheet has cooled beyond a "pliable or malleable state", further processing may be accomplished by several finishing processes, including, but not limited to, planing, sanding, cutting, routing, scoring or any combination thereof.

A planer and/or sander may be used to size the extrudate sheet to its final thickness, width, and/or length. Additionally, the use of a planer, sander, router, etc. may be used to transform the sides of the extrudate sheet into interlocking edges. As illustrated in FIGS. 3A-3C, the finished EHB product 300 may comprise a first edge 305A and second edge 305B configured to interlock with one another. In a preferred embodiment, a plurality of finished EHB boards may be fitted together using locking edges, wherein a first edge 305A of a first finished EHB board 300A is configured to interlock with a second edge 305B of a second finished EHB board 300B. The plurality of edges of the finished EHB boards is preferably "tongue and groove" style, which allows for the first finished EHB boards 300A to interlock with the second finished EHB boards 300B, as illustrated in FIG. 3A. In another preferred embodiment, the locking edges of the finished EHB boards may be comprise a notch and groove style edge as depicted in FIGS. 3B and 3C, which may allow for easier installation when compared to other locking edge styles. The finished EHB board used for construction is generally rectangular in shape, as depicted in FIGS. 3A, 3B, 4, 6, 7, and 8; however, in other preferred embodiments, the finished EHB product 300 may comprise abstract shapes that allow for the interlocking of the finished EHB product 300 in multiple directions to create a more structurally stable structure, as depicted in FIGS. 3C and 5.

In some embodiments, the planer, sander, router, etc. may be used to create texture to increase bonding of laminates, paper, films, paint, tar, wax, glue, or any combination thereof. In other embodiments, a router may be used to create channels 405 within the extrudate sheet. The channels 405 are preferably located on the bottom surface of the extrudate sheet and sized in a way such that electrical hardware, plumbing, and radiant heating 705 may installed in the channels 405. The arrangement of the channels 405 may be the same for each finished EHB product 300 or may comprise a plurality of patterns 1200 that may be mixed and matched to create a custom channel. For example, a finished EHB product 300 optimized for use with electrical hardware may comprise a plurality of perpendicular channels 405 that allow for the routing of electrical wiring through said finished EHB product 300. In another example, a finished EHB product 300 optimized for use with radiant heating 705 may comprise different channels 405 that may be aligned in a way that allows a user to create a custom route for a custom, radiant flooring system through said finished EHB product 300. In embodiments of a finished EHB product 300 that are to be used for radiant heating 705, the board thickness of at least ½ inch is preferable so that the finished EHB product 300 can accommodate the plumbing required for the radiant heating system.

In one preferred embodiment, an inline cutting device may be used to cut the extrudate sheet to the desired length. The inline cutting device may also be used to cut more intricate shapes into the extrudate sheet, such as slots, holes, custom angles, edges, and fastener points. In a preferred embodiment, the inline cutting device comprises at least one of reciprocal blades, wheels, knives, laser, water, or CNC type cutting. For right-angled smooth cuts, it is essential to select the correct saw speed and blade for the binder material 107C used and the thickness of the sheet. After cutting, the resulting finished EHB product 300 is lifted by a stacker and stacked. Alternatively, the stacker may move the finished EHB product 300 to a conveyor where it may be at least one of primed, painted, chemically treated, corona treated, edge coated, laser etched, laminated, tarred or any combination thereof.

As illustrated in FIG. 13, an optional fastener 1300 may be used to fasten the finished EHB product 300 to a structure. The optional fastener 1300 preferably comprises a cylindrical body 1310 comprising a trailing end, advancing end, and proximal portion having plurality of barbs 1315. As illustrated in FIG. 13, the head 1305 of the optional fastener 1300 is located at the trailing end and generally has a larger radius than the plurality of barbs 1315 located on the proximal portion. In other embodiments, the head 1305 of the optional fastener 1300 may have a radius equal in size to the radius of the plurality of barbs 1315 in instances where a more finished product is needed. In some preferred embodiments, the head 1305 of the optional fastener 1300 is not cylindrical in shape. The shape of the head 1305 of the optional fastener 1300 may be rounded, oval, brad, oval countersunk, diamond, duplex, flat, spring, cup, and checkered. Further, the optional fastener 1300 may be optimized for use in a nail gun.

In a preferred embodiment, as illustrated in FIG. 14, the structure in which the optional fastener 1300 is being secured to is a building frame. The proximal portion of the optional fastener 1300 may have a fixed diameter, or it may have a varied diameter. For example, the diameter of the proximal portion having a plurality of barbs 1315 may be larger than the diameter of the proximal portion not having a plurality of barbs 1315. In one preferred embodiment, the proximal portion may end in a tip, wherein the proximal portion is barbed at least three quarters of the way to said tip. This may allow a user to implant an optional fastener 1300 without the need of predrilling a hole into the building frame in which the optional fastener 1300 is to be placed. The plurality of barbs 1315 of the proximal portion may vary in form, angle, and depth, depending on the need. For example, the shape of the plurality of barbs 1315 of an optional fastener 1300 designed for subflooring may have a smaller depth, which may result in less grip to the building frame. In another example, the shape of the plurality of barbs 1315 of an optional fastener 1300 designed for roofing may be more hooklike and the angle may be more acute to allow for stronger grip with the finished EHB product 300.

Some embodiments of an optional fastener 1300 may also comprise a washer 1405. A washer 1405 may be defined as a conical body having a central bore extending longitudinally through the washer 1405 and defined by an inner surface, wherein the diameter of the central bore is no wider than the head 1305 on the trailing end of the optional fastener 1300 in which the washer 1405 is paired. A washer 1405 further comprises an upper end, lower end, outer surface, and inner surface. The optional fastener 1300 may be inserted into a washer 1405 via the central bore. As the optional fastener 1300 is inserted into the finished EHB product 300, the head 1305 of the optional fastener 1300 may come into contact with the surface of the washer 1405 at the upper end. The larger surface area of the washer 1405 may spread the compression force of the optional fastener 1300 over a larger area of the finished EHB product 300, thus decreasing the likelihood that too much pressure is applied to a portion of the finished EHB product 300 in which the optional fastener 1300 is being implanted. In some preferred embodiments of a washer 1405, the material used to create the washer 1405 is flexible to allow for attachment after creation of the optional fastener 1300. Further, some embodiments of the washer 1405 may comprise a water-resistant material such as rubber and silicon which may seal the area in which optional fastener 1300 penetrates into the finished EHB product 300.

Due to the use of recycled materials and sustainable hemp feedstocks, the various finished EHB products 300 described herein will result in a tremendous benefit to the environment when evaluated through a life cycle analysis (LCA). Finished EHB products 300 under LCA will show that by using sustainable hemp feedstocks, reclaimed "waste" materials from construction and manufacturing processes, reduced shipping weights, and streamlined processing will dramatically offset the carbon offenses in the construction industry, and provide permanent carbon sequestration opportunities that currently do not exist in available construction materials. Additionally, the finished EHB products 300 described may include carbonized materials by way of secondary feedstocks, allowing for high carbon sequestration crops, such as hemp and/or bamboo, to be grown and turned into bio-carbon via pyrolysis before incorporation into the finished EHB products 300 as a carbon sink. As such, when compared with traditional construction materials, the LCA will show that the finished EHB products 300 described herein are not only superior in terms of carbon capture, lifespan, and physical properties but are also more sustainable.

Although the systems and processes of the present disclosure have been discussed for use within the construction material field, one of skill in the art will appreciate that the inventive subject matter disclosed herein may be utilized in other fields or for other applications in which hemp-based composites are needed. The implementations set forth in the foregoing description do not represent all implementations consistent with the subject matter described herein. Instead, they are merely some examples consistent with aspects related to the described subject matter. Although a few variations have been described in detail above, other modifications or additions are possible. For example, the implementations described above can be directed to various combinations and sub-combinations of the disclosed features and/or combinations and sub-combinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and process stages which have been described and illustrated to explain the nature of this inventive subject matter can be made without departing from the principles and scope of the inventive subject matter.

What is claimed is:

1. A mono-extruded hemp composite board (EHB) comprising:
    a mixed extrudate comprising a binder material and a hemp feedstock,
    wherein said mixed extrudate has been shaped into a rigid composite board,
    wherein said rigid composite board comprises a bottom surface, top surface, first edge, second edge, upper edge, and lower edge,
    wherein said rigid composite board comprises at least one channel on said bottom surface,
    wherein said mixed extrudate of said rigid composite board is of a single layer,
    wherein said mixed extrudate comprises at least 8% of a total weight percentage of a hemp feedstock and no more than 50% of said total weight percentage of said hemp feedstock,
    wherein components of said hemp feedstock comprise hemp hurd and hemp bast fiber,
    wherein said hemp hurd and said hemp bast fiber are separate components of a hemp biomass,
    wherein said hemp hurd is separated from said hemp bast fiber prior to creation of said mixed extrudate,
    wherein a length of said components of said hemp feedstock is no greater than ⅜ inches,
    wherein said mixed extrudate comprises at least 50% of said total weight percentage of said binder material,
    wherein said components of said hemp feedstock are substantially encapsulated by said binder material within said mixed extrudate,
    wherein said components of said hemp feedstock are evenly dispersed throughout said mixed extrudate,
    wherein said binder material comprises at least one of polyolefin, polyethylene, polyamide, and polypropylene, and
    wherein said mixed extrudate is substantially oriented in an output direction of an extruder due to a shear force acting on said mixed extrudate as it was ejected from a manifold,
    a pipe configured to fit within said at least one channel of said rigid composite board.

2. The EHB of claim 1, further comprising a first locking feature located on said first edge and a second locking feature located on a second edge,
    wherein said first locking feature is a rounded edge feature and said second locking feature is a hooked edge feature,
    wherein said first locking feature of said first edge extends along said first edge and at a distance between said upper edge and said lower edge,
    wherein said second locking feature of said second edge extends along said second edge and at a distance between said upper edge and said lower edge, and
    wherein said rounded edge feature is configured to interlock with said hooked edge feature.

3. The EHB of claim 1, wherein said components of said hemp feedstock are chemically treated prior to addition to said binder material to increase bonding with said binder material.

4. The EHB of claim 1, wherein said mixed extrudate is a foamed, mixed extrudate, wherein said foamed, mixed extrudate is created by adding a blowing agent to said hemp feedstock and said binder material during extrusion, wherein gasses of said blowing agent dissolve into said mixed extrudate to create said foamed, mixed extrudate prior to ejection from said manifold.

5. The EHB of claim 1, further comprising at least one of carbon, glass fiber, wood fines, and gypsum in said mixed extrudate, wherein said carbon, glass fiber, wood fines, and gypsum are added to said extruder at a point prior to ejection of said mixed extrudate from said manifold.

6. The EHB of claim 1, further comprising a plurality of notches on said top surface of said rigid composite board, wherein said plurality of notches are configured to accept an adhesive used to bind a flooring material thereto.

7. The EHB of claim 1, wherein said at least one channel has a width of no greater than ¾ inches and a height of no greater than ¾ inches, wherein said at least one channel of a first rigid composite board aligns with said at least one channel of a second rigid composite board.

8. The EHB of claim 1, further comprising an optional fastener disposed through said top surface, bottom surface, and a support surface,
   wherein said optional fastener secures said rigid composite board to said support surface,
   wherein a shaft of said optional fastener comprises a plurality of barbs aligned in at least two rows around said shaft, and
   wherein said plurality of barbs of a first row are larger than said plurality of barbs of a second row.

9. The EHB of claim 8, wherein said optional fastener further comprises a washer secured about said shaft, wherein a central bore of said washer has a diameter smaller than a head of said optional fastener.

10. A mono-extruded hemp composite board (EHB) comprising:
    a mixed extrudate comprising a binder material and a hemp feedstock,
      wherein said mixed extrudate has been shaped into a rigid composite board,
      wherein said rigid composite board comprises a bottom surface, top surface, first edge, second edge, upper edge, and lower edge,
      wherein said rigid composite board comprises at least one channel on said bottom surface,
      wherein said mixed extrudate of said rigid composite board is of a single layer,
      wherein said mixed extrudate comprises at least 8% of a total weight percentage of a hemp feedstock and no more than 50% of said total weight percentage of said hemp feedstock,
      wherein components of said hemp feedstock comprise hemp hurd and hemp bast fiber,
      wherein said hemp hurd and said hemp bast fiber are separate components of a hemp biomass,
      wherein said hemp hurd is separated from said hemp bast fiber prior to creation of said mixed extrudate,
      wherein a length of said components of said hemp feedstock is no greater than ⅜ inches,
      wherein said mixed extrudate comprises a secondary feedstock,
      wherein said mixed extrudate comprises at least 50% of said total weight percentage of said binder material,
      wherein said components of said hemp feedstock are substantially encapsulated by said binder material within said mixed extrudate,
      wherein said components of said hemp feedstock are evenly dispersed throughout said mixed extrudate,
      wherein said binder material comprises at least one of polyolefin, polyethylene, polyamide, and polypropylene,
      wherein said mixed extrudate is substantially oriented in an output direction of an extruder due to a shear force acting on said mixed extrudate as it was ejected from a manifold,
    a first locking feature located on said first edge,
      wherein said first locking feature is a rounded edge feature,
      wherein said first locking feature of said first edge extends along said first edge and at a distance between said upper edge and said lower edge, and
    a second locking feature located on said second edge,
      wherein said second locking feature is a hooked edge feature,
      wherein said second locking feature of said second edge extends along said first edge and at a distance between said upper edge and said lower edge,
      wherein said rounded edge feature is configured to interlock with said hooked edge feature,
    at least one pipe configured to fit within said at least one channel of said rigid composite board.

11. The EHB of claim 10, wherein said mixed extrudate is a foamed, mixed extrudate, wherein said foamed, mixed extrudate is created by adding a blowing agent to said hemp feedstock and said binder material during extrusion, wherein gasses of said blowing agent dissolve into said mixed extrudate to create said foamed, mixed extrudate prior to ejection from said manifold.

12. The EHB of claim 10, further comprising a plurality of notches on said top surface of said rigid composite board, wherein said plurality of notches are configured to accept an adhesive used to bind a flooring material thereto.

13. The EHB of claim 10, wherein said at least one channel has a width of no greater than ¾ inches and a height of no greater than ¾ inches, wherein said at least one channel of a first rigid composite board aligns with said at least one channel of a second rigid composite board.

14. The EHB of claim 10, further comprising an optional fastener disposed through said top surface, bottom surface, and a support surface,
    wherein said optional fastener secures said rigid composite board to said support surface,
    wherein a shaft of said optional fastener comprises a plurality of barbs aligned in a first row and second row, and
    wherein said plurality of barbs of said first row are larger than said plurality of barbs of said second row.

15. The EHB of claim 14, wherein said optional fastener further comprises a washer secured about said shaft, wherein a central bore of said washer has a diameter smaller than a head of said optional fastener.

* * * * *